July 13, 1965     G. G. RUMBERGER     3,194,474
HEAT-SEALING CARTONS
Filed Aug. 23, 1961                                            5 Sheets-Sheet 1
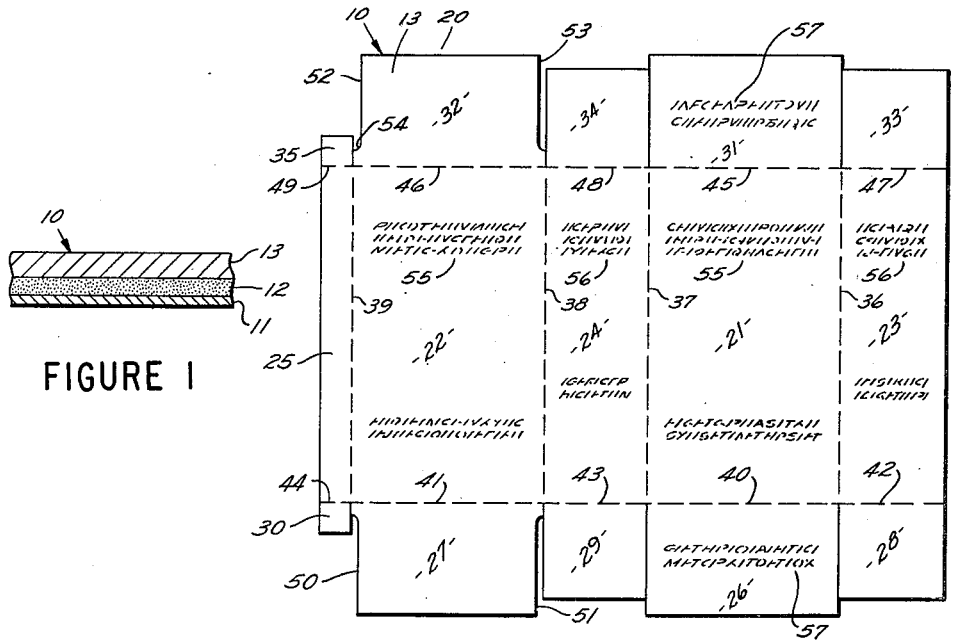
FIGURE 1
FIGURE 2
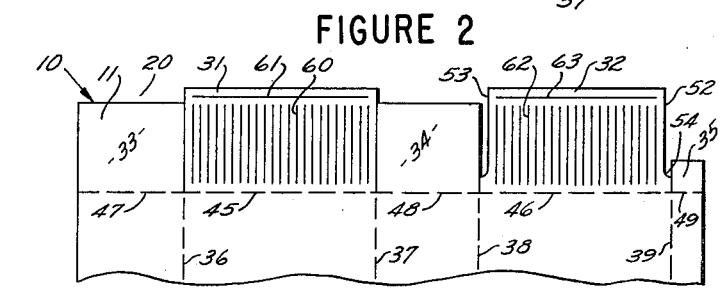
FIGURE 3
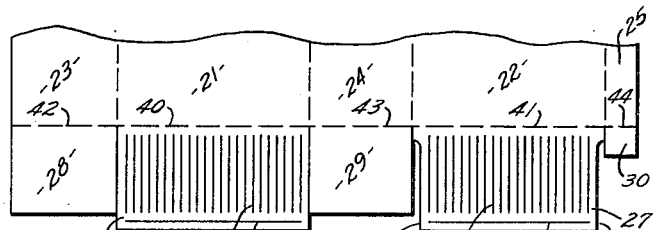
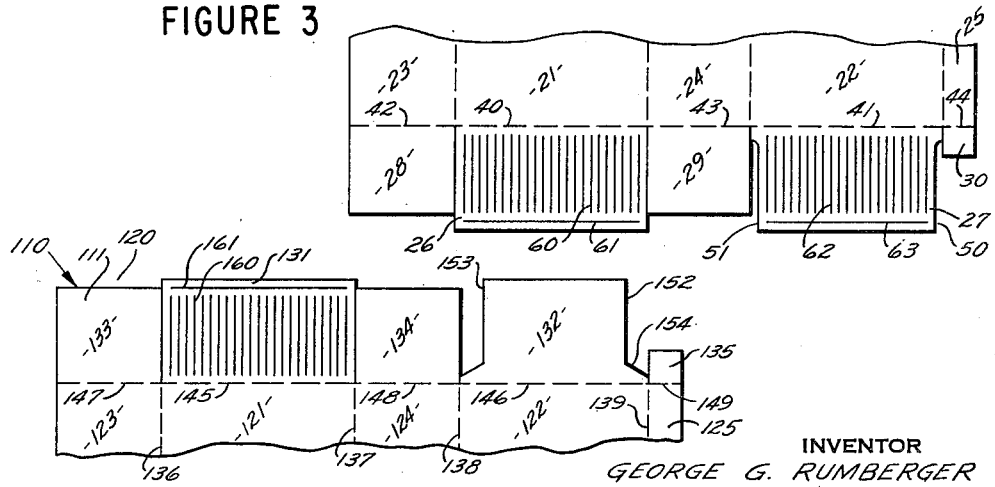
FIGURE 6
INVENTOR
GEORGE G. RUMBERGER
BY
ATTORNEY July 13, 1965

G. G. RUMBERGER 3,194,474

HEAT-SEALING CARTONS

Filed Aug. 23, 1961

INVENTOR
GEORGE G. RUMBERGER
BY
ATTORNEY

July 13, 1965

G. G. RUMBERGER 3,194,474

HEAT-SEALING CARTONS

Filed Aug. 23, 1961

INVENTOR

GEORGE G. RUMBERGER

BY

ATTORNEY

July 13, 1965  G. G. RUMBERGER  3,194,474
HEAT-SEALING CARTONS
Filed Aug. 23, 1961  5 Sheets-Sheet 4

INVENTOR
GEORGE G. RUMBERGER
BY
ATTORNEY

July 13, 1965  G. G. RUMBERGER  3,194,474
HEAT-SEALING CARTONS
Filed Aug. 23, 1961  5 Sheets-Sheet 5

INVENTOR
GEORGE G. RUMBERGER
BY
ATTORNEY

United States Patent Office 3,194,474
Patented July 13, 1965

3,194,474
HEAT-SEALING CARTONS
George G. Rumberger, Portage Township, Kalamazoo County, Mich., assignor to KVP Sutherland Paper Company, Kalamazoo, Mich., a corporation of Delaware
Filed Aug. 23, 1961, Ser. No. 133,439
39 Claims. (Cl. 229—37)

The present invention relates to carton blanks and cartons, and is more particularly concerned with carton blanks in which the adhesive for sealing of the carton erected from such blanks is indigenous to the material of construction of the carton blanks, with erected and sealed cartons formed from such blanks, and with a novel method of forming such carton blanks and sealed cartons. Because the adhesive in certain requisite amounts is indigenous to the particular material of construction of the carton blanks of the invention and cartons formed therefrom in preselected heat-sealing areas where such is required, e.g., in the closure flaps, there is no need to provide adhesive extraneously. Because of certain means provided in the said heat-sealing areas, the adhesive is both activated and provided in place in the preselected carton areas, in which a seal is desired, upon the application of adhesive-activating conditions. The combination of these several elements allows results which are unprecedented in the carton field.

The carton blanks and cartons of the present invention are constructed of laminated sheet material in which the laminant is a thermoplastic laminant adhesive which is present in the said sheet material in at least a certain necessary minimal quantity per ream, or in at least a certain necessary minimal thickness. The base plies of the said laminated sheet material also have certain requisite characteristics.

By the provision of the said laminated sheet material having the certain requisite base sheet and laminant characteristics and by providing scored carton blanks and cartons thereof, which are additionally provided with (a) openings, e.g., slits, cuts, or foramen, from the outer surface of at least one ply of the laminated sheet material into the intercalated thermoplastic laminant adhesive in heat-sealing areas where the surface of an end, side, front, or other closure flap or carton faces lies or will lie in opposed facing relationship with the surface of another flap or carton face to which it is to be secured, or alternatively with (b) perforations extending entirely through such a carton member, e.g., closure flap, from face to face and through all plies thereof, especially where both surfaces of such carton member, e.g., closure flap, lie or will lie in opposed facing relationship with other carton surfaces, unprecedented carton seals are attained upon activation of the thermoplastic adhesive laminant indigenous to the carton construction in the said heat-sealing areas thereof to cause extrusion of the said adhesive through the said ply openings, and setting of the adhesive by allowing the same to congeal, thereby providing bodies of solidified adhesive integrally bonding the various surfaces and plies of the carton construction together in the said heat-sealing areas. The carton blanks, cartons, and method of forming blanks and sealed cartons according to the present invention are of particular interest with relation to the provision of leakproof and hermetically sealed cartons or carton-like containers and the hermetic closure thereof, all of which is accomplished by extrusion of the thermosplastic laminant adhesive in the molten or semi-molten state through the ply openings provided in said carton heat-sealing areas, and from cut edges also provided in the carton construction. In one preferred embodiment of the invention, an intermediate closure flap of the carton is recessed at its edges so that an outer flap of the carton overlies the intermediate flap along its edges, so as to provide an area of opposed facing relationship between an outer flap and an inner flap or flaps in the area of overhang of said intermediate flap by said outer flap, all of said flaps carrying thermoplastic laminant adhesive intercalated between the plies of their base sheet materials, which adhesive is provided and activated in place at least in the said area of overhang through cut edges and preferably also through openings provided in the plies of said flaps in the area of overhang, as well as through additional openings in other heat-sealing areas of the flaps thereby providing carton closures and seals which are unprecedented as to their strength and, if desired, proofness, and therefore of particularly interest for hermetic sealing. All these results are accomplished by the particular combination of method and means for the provision, activation, extrusion, and setting of the thermoplastic laminant adhesive of the sheet material of the carton construction in the preselected carton heat-sealing areas, which thermoplastic adhesive laminant is moreover substantially and usually completely absent from the exterior exposed faces of the sealed carton.

Numerous carton blanks and cartons have already been proposed and adopted in practice which are provided on at least one end or elsewhere with closure flaps or members, adapted to be overlapped with other carton members or folded over and in any event adhesively secured. Side seams, side overlaps, front closures, top and bottom closures, and the like, are thereby provided. In many instances, the carton blank or carton is provided with similar flaps at both ends. In such cartons, for example, at one or both ends, a carton closure is usually formed by adhesively securing flaps which lie with the surface of one flap upon the surface of another flap, with certain of the flaps presenting free or cut edge surfaces along opposite edges of the closure. The contiguous surfaces may be either horizontal, as with top and bottom end closure flaps, or vertical, as with side closures or seams, front closure flaps, or the like. This is the case whether the shape of the carton is conventionally square or rectangular, or round, oval, triangular, pentagonal, hexagonal, or otherwise polygonal, in its cross-sectional configuration, or any of numerous additional shapes in which such type cartons are already known or can be made. Such types of cartons may be sealed by conventional gluing in a preselected sealing area, and in some cases may be provided with hot melt or other adhesives on the inner surfaces of outer or intermediate flaps, for sealing of the carton upon the application of heat or heat and pressure thereto. However, these methods of sealing have not been successful in eliminating the edge wicking of vapors and liquids and the considerable transfer through the carton which results in this manner remains an unsolved packaging problem. Moreover, the application of hot metal adhesives to preformed carton blanks cut from base sheets laminated together with thermoplastic adhesives has been impossible due to delamination of the sheet materials during the application of the hot melt adhesive, or during its reactivation on packaging machinery, and thus the use of an important class of packaging materials, viz., laminated sheet materials, in heat sealing cartons has been precluded.

Other procedures used to hermetically seal cartons or carton-like containers have involved the application of conventional cold adhesives on packaging machinery followed by a hot wax, wax and rubber, or other dip, paint, or spray of the carton closures for purposes of proofing and sealing at least the ends of the cartons against water-vapor transmission, since it is at the carton ends and seams where the closure is effected by folding one flap upon another that the greatest leakage is likely to occur by wicking or otherwise. While there can be no question about the initial proofness or seal of cartons which are wax-dipped, this is indeed an untidy and uneconomic operation and not one which can readily be accomplished on or in conjunction with rapidly-moving packaging equipment, naturally involving at least one additional step after completion of the usual packaging operation, depending upon whether the entire carton is dipped as a whole or whether the ends are dipped separately. In addition, dipped cartons are subject to abrasion or rupture of the coating material not only throughout the entire coated area but especially along free edges of flaps, and rupture of the coating material along a surface or edge of the carton adjoining any area of overlap of one flap by another flap also tends to rupture coating material collected therein due to stresses on the exposed coating which are conveyed from the exterior via the integral mass of coating material. Moreover, wax dipped or coated cartons leave much to be desired by way of their appearance and, in handling, considerable amounts of coating provided by a dipping, painting, or spraying operation frequently chip off and cause displeasure, discomfort, annoyance and an unsightly appearance when coming into contact with the contained product or with hands, clothing, or personal effects of the consumer. In addition, dipped cartons have a tendency to block together during hot weather or upon temperature increases generally, causing loss of protectiveness when the packages are separated for distribution, so that dipping, spraying, or painting is in fact avoided whenever possible, as by innerwrapping of the product, overwrapping of the carton, or the like, which approaches in turn also involve additional steps or operations and leave much to be desired.

It has moreover already been proposed to provide heat-sealing sheet materials by laminating a relatively porous tissue sheet to an adhesive-impermeable sheet in a manner such that the laminating adhesive differentially migrates in various ways through the porous tissue on the application of heat, as in the United States patents of Farrell et al., 2,430,459, 2,446,414, and 2,474,619, Graebner et al. 2,415,387, or Ireton 2,714,952. Although this approach has been successful in providing heat-sealing bags, carton overwraps and labels, it has been found lacking in a number of important respects when attempted to be adapted to combinations of heavier sheets, especially heavier non-porous sheets or combinations in which both sheets are porous or have equal migration rates for the laminating adhesive, and particularly unadaptable to cartons, especially scored cartons of the type with which the present invention is concerned, and most of all unadaptable to the production of cartons of the leakproof or hermetically sealed type. The present applicant is fully cognizant of all of these prior art procedures, practices and proposals, as well as their shortcomings, having been integrally associated with the packaging industry, and especially the carton industry, for a period of over twenty years.

Thus, despite the fact that it has long been recognized that it would be highly desirable to have available cartons which could be rapidly and effectively sealed, especially on rapidly-moving carton erecting and filling equipment as ordinarily employed in the packaging industry, which would be equally adaptable to both leakproof and non-leakproof closures, and especially adaptable to proofed or hermetic sealing, which would not be subject to the disadvantages attendant upon previous procedures involving innerwrapping, overwrapping, dipping, spraying, painting or the like, all efforts up to the present time have fallen short of this objective.

It is therefore an object of the present invention to provide cartons which carry within the materials of their construction as an indigenous part thereof their own sealing adhesive, and which are not subject to the disadvantages hereinbefore mentioned. Another object of the invention is to provide cartons which are sealable by heat or heat and pressure or like adhesive-activating conditions to provide a more satisfactory seal of the various carton closures thereof, than previously attained or attainable by any known method or possible in any previously known carton of the same or similar type. Another object is the provision of such a carton in which the edges of both the outer and the intermediate flap which underlies the outer flap may optionally be completely and conveniently sealed. An additional object is the provision of heat-sealing cartons which may be sealed by the application of heat or heat and pressure and which do not bow because of the application of such conditions as is commonly experienced with such type sealing cartons.

A further object of the invention is to provide such cartons which seal readily and effectively upon the application of heat or heat and pressure due to the fact that, especially when heat alone is employed, only one layer of carton thickness must be penetrated to effectuate the seal. A still further object is the provision of carton blanks from which such cartons are produced, and still an additional object is the provision of such carton blanks and cartons formed therefrom which are characterized by the presence of an inner flap, an intermediate flap, and an outer flap, which flaps are adapted to be folded in sequence to provide a plural layered closure in which the flaps lie with the surface of one flap upon the surface of another, and in which at least one of said intermediate and outer flaps is provided, in a ply thereof constituting one of the surfaces of said intermediate and outer flaps which come into opposed facing relationship upon folding of the flaps and closing of the carton, with openings from the outer surface thereof to the intercalated laminant layer thereof, whereby upon erecting a carton therefrom, closing of the flaps, and applying thermoplastic laminant adhesive-activating conditions to said flap provided with said openings the thermoplastic adhesive laminant is caused to extrude from the intercalated laminant layer thereof through said openings, and whereby upon cooling or congealing of the thus-extruded laminant an effective seal of said outer flap to said intermediate flap is provided in the area of their opposed facing relationship by means of bodies of solidified thermoplastic laminant adhesive extending from the intercalated laminant layer of at least the one flap through the openings provided in the ply of that flap to at least the surface of the other flap. When the opposing plies of the several flaps are both provided with such openings, the solidified bodies of the adhesive will extend from the outer ply of the one flap through the openings to the outer ply of the other flap. Additional objects involve the provision of carton blanks and cartons in which openings into the intercalated layer of thermoplastic laminant adhesive are provided in more than one surface of the same flap, or various plies constituting opposing or non-opposing surfaces of different flaps, and still an additional object is the provision of such carton blanks and cartons formed therefrom as are also characterized by an area of overlap between the outer and intermediate carton flap closure members and in which the adhesive necessary for the sealing of such cartons is indigenous to said flaps and adapted to be disposed in the said area of overlap of the intermediate flap by the outer flap and activated upon the application of adhesive-activating conditions. A further object is the provision of a novel method of forming such carton blanks and sealed cartons as aforesaid. Other objects of the invention will become apparent to one skilled in the art and still other objects will become apparent hereinafter.

I have now found that I can overcome many of the previous disadvantages of heat-sealing and leakproof cartons by not only constructing my cartons from laminated sheet materials of particular characteristics but, in addition, by employing the laminating adhesive not only for adhering the various sheets or plies together but also for effecting the carton seal and providing for its reactivation and redistribution for such heat sealing functions. This is accomplished through a novel initial distribution to specific localities of the carton construction.

I have also found that the foregoing and additional objects of the invention are accomplished by the provision of scored carton blanks and cartons and a novel method of forming the same, in all of which are employed an unprecedented quantity or thickness of thermoplastic adhesive laminant, and by providing such scored carton blanks and cartons from laminated sheet material having certain additional requisite characteristics, which carton blanks and cartons are additionally provided with openings through at least one ply of said laminated sheet material into the intercalated thermoplastic laminant adhesive in heat-sealing areas where the surface of an end, side, front, or other closure flap or face will oppose or opposes the surface of another flap or carton face to which it is or is to be secured, when brought into juxtaposition therewith, or alternatively with perforations extending through such a carton member from face to face thereof, especially where both surfaces of such closure member lie or will lie in opposed facing relationship to surfaces of carton flaps or other carton members when brought into juxtaposition therewith. By the employment of substantially increased quantities of thermoplastic adhesive laminant, considerably in excess of those quantities employed previously for laminated sheet materials used in scored carton construction, in combination with selected base sheet materials having the requisite openings, and by extruding to provide "rivets" or "bodies" of adhesive, and by thus taking a direction quite to the contrary of that indicated by established adhesive theory, I have found that I can produce a carton seal which is ordinarily sufficiently strong that, upon opening of the carton, the fibers of the basic sheet materials employed in the laminated sheet material are subjected to rupture rather than the lamination or the seal itself, in sharp contrast to cartons of a somewhat similar nature employed previously in which either the seal or the lamination ruptures considerably in advance of rupture of the fibers of the base sheet materials of the laminate. As a consequence, the strength of the lamination or seal in the cartons of the present invention does not become the limiting factor in determining the use or adaptability of the carton structure. In addition, the cartons of the present invention, when desired, can be made hermetically sealed and substantially leakproof to an extent not previously attainable in heat-sealing cartons despite the absence of any or substantially any adhesive laminant on the exterior exposed faces of the carton.

According to the invention, the laminated sheet material employed in the carton construction contains at least about fifty-five pounds and preferably greater amounts of thermoplastic adhesive laminant per standard 24 inches by 36 inches by 500 sheet ream of the laminated sheet material. This permits unprecedented sealing characteristics. In addition, the base plies of the laminated sheet material have a porosity of at least five and preferably ten seconds. This permits the desired extrusion and allows scoring and provision of necessary openings without fragmentation. This basic combination appears to be fundamental to the heat-sealing adequacy of the cartons of the invention, as more fully explained hereinafter.

Repeated attempts to form an adequate heat sealing carton from relatively open sheets, such as porous tissues, have led only to failure. When the thinnest sheet of a given lamination is too porous, a number of unfavorable results are obtained. During lamination to the heavier, or to a like sheet, excessive bleed through the sheet occurs, allowing wax or other laminating agent to deposit on the surface of the sheet, which subsequently interferes with cutting, scoring and printing, especially when laminations are made with the amount of thermoplastic material I have found necessary to form adequate carton seals.

Even though the wax or other thermoplastic adhesive may be limited to the adhesive interfaces during laminating, such as by control of viscosity of the laminant, I have found that the thermoplastic laminant is forced, during subsequent cutting and scoring, which involves use of high pressures over limited areas, through the porous sheets at scored or cut areas, thus building up on dies and cutters to the point of rendering these operations difficult if not impossible. Since the porous sheets are lacking in strength, tearing and breaking often accompanies such sticking.

It has also become evident, through investigations of the factors involved, that the use of porous papers or pre-perforated sheet materials results in a general over-all migration of considerable quantities of the thermoplastic adhesive during heat sealing, which is undesirable when use of the adhesive in predetermined areas, and especially in the form of extruded "rivets" or "bodies" of adhesive, as in the cartons of the present invention, is required.

For the above reasons I have found it necessary to use sheets having a porosity, as defined by the air resistance test of TAPPI method T460 M–49, of at least five seconds and preferably ten seconds or above. By contrast, I have found that porous tissues, or like open sheets, often have a porosity value of less than one, and seldom greater than two, seconds.

I have also found porous tissues lacking in the strength necessary to withstand scoring and subsequent folding, and my thinnest paper sheets are therefore generally chosen with a Mullen dry burst strength of ten or above, and preferably fifteen or above, as determined by TAPPI procedure T403. However, strength may not be critical, and is generally not as critical as porosity, especially when stretchable materials such as creped papers, or plastic films such as polyethylene or polyvinyl chloride films, are used as the thinnest sheet of the laminate.

The requisite openings, interstices, or apertures in one or more plies of the carton member or members in accord with the present invention may be and preferably are slits or cuts, and their disposition may be either longitudinal, transverse, or diagonal, and when present in more than one carton member, or when upon folding of the carton the slits or cuts in a ply of one member oppose the slits or cuts in an opposing ply of another carton member, they may be the same or different, in any combination of longitudinal, transverse, or diagonal disposition, including diagonal slits in the ply of one member and reverse diagonal slits or cuts in the ply of the other member, e.g., an underlying flap member. The slits or cuts may be of the aforesaid types, whether only one, or more than one, ply of one or more than one carton member is slit or cut, and whether or not the said slit or cut plies are opposed and in contact with each other upon folding of the carton members. When "perforations" are present, said term being understood to indicate openings which go through the entire sheet material from one surface thereof to the other, i.e., through all plies of the sheet material, such perforations may be slit, cut, punched, square, rectangular, circular, oval, triangular, diamond-shaped, dogeared, elliptical, or of any other type or shape and, when slits or cuts or rectangles or the like, may be longitudinal, transverse, diagonal, any combination thereof, or of any other direction or configuration, and may be imparted to the carton member with or without removal of a part of the sheet material of construction as by drilling or punching. If openings in only one ply of sheet material are present, these may be in shapes and sizes other than slits or cuts, and may be of any configuration or type mentioned for perforations, but are preferably slits or cuts, and usually at least one-sixteenth inch apart or approximately twelve to the inch, and at any rate ordinarily no less than two leads (.056 inch) apart. In addition, any carton flap or other member, but preferably an intermediate flap, may be provided with a combination of openings (such as slits, or cuts, or circular cutouts, or the like) in one ply of the flap and also perforations entirely through the same flap, or the flap may be provided with openings such as aforesaid in both outer plies thereof, with or without removing laminant or other material of construction, or any other combination of openings and/or perforations may be employed on either or both surfaces of a single flap or other carton member as the problem of laminant desirability in a particular area may require. Whether the openings are present in only one ply or in more than one ply, and whether in the form of perforations, slits, cuts, or the like, the openings are ordinarily at least 1/32 and usually at least 1/16 of an inch in at least one dimension, and in any event have dimensions greatly exceeding the dimensions of the pore openings normally present in the fibrous sheet materials employd in the laminate.

I have found it preferable to provide the necessary openings or foramen, usually in the form of slits or perforations, and any desired cut edges, for the extrusion of the laminating adhesive used in the construction of my heat sealing cartons, at some stage after the laminating step, and during or after the formation of scores and cutouts necessary for the delineation of the carton structure, and preferably after the printing of any required indicia or artwork which must be registered with the carton faces. In this way the means for extrusion of the laminating adhesive are located in exactly the desired zones as required for the formation of the desired bond or seal, and laminant adhesive is not randomly extruded as would be the case if openings were placed in one or both of the sheet materials in advance of the laminating step. Furthermore, due to the character of the slits or perforations provided and the amount of adhesive used as laminant, it is necessary that they be provided following the lamination step, as this prevents unwanted transfer of the molten hot melt used in the laminating step through the sheet prior to the moment of its intended use in sealing of the carton.

Inasmuch as the functioning of the sealing and laminating adhesive of my carton construction does not depend on the principle of differential migration by absorption, but rather on extrusion under heat or heat and pressure, the choice of sheet materials which can be used is quite broad, as they can be of equal or differing calipers and porosities. In general, I prefer to use a lighter sheet for the inside ply of the laminated sheet material, although for some applications the heavier sheet may form the inside surface of the carton wall. When the heavier sheet is placed on the side which will become the outside surface of the carton, it will generally be a pigment coated paper or paperboard to provide a good printing surface, and to obtain other advantages which will be hereinafter described. At least one sheet of the laminated sheet material must have sufficient strength to provide structural rigidity, and ordinarily both sheets will have sufficient strength for this purpose and will each exceed about ten pounds per inch in tensile strength as determined by TAPPI method T404m. In some cases, the tensile strength of one or both sheets will be much higher then required for specific packaging applications. The thickness of the sheet materials employed in the laminated sheet material will generally range from about .002 to about .016 inch, with a thickness of laminant from about .004 inch to about .015 inch but usually ranging from about .004 to about .008 inch. While the thickness of the sheet materials as mentioned is usually from about .002 to .016 inch, I may employ paperboard sheet material as one ply of the laminated sheet which has a thickness as great as .03 inch.

Any or all sheet materials used as base sheet material stocks for production of the starting laminated sheet material may be treated in any of various ways, such as by printing, treating for grease-proofness or wax hold-out, glossing, and the like, and such treatment will ordinarily be applied prior to lamination. Representative sheet materials include, in addition to paper and paperboard, parchment papers, papers containing foil mounted thereon, grease-proof papers, glassine papers, non-woven fabrics, and the like.

As further indicative of base material stocks which are suitable for incorporation into laminated sheets for scoring and cutting into carton blanks and erecting into cartons according to the present invention, there may be mentioned the usual paper or paperboard sheets, such as made on a cylinder machine or a multiple-headbox Fourdrinier machine, having a number of plies, or heavy paper sheets having only a single ply. Generally speaking, the base sheet stock may be any fibrous cellulosic or synthetic sheet, but in some cases may include foils or films as one ply thereof. Aluminum foil may sometimes advantageously be used for one ply, especially when the ply is to become the inside surface of a carton. In such cases the aluminum foil may be and preferably is mounted on a light paper before gluing or laminating to a second fibrous ply, foil side in. For highest possible moisture-vapor proofness, these sheet stocks may be additionally proofed, including for example dry waxed, semi-waxed, or surface waxed paperboard or paper materials, or polyethylene-coated materials, or the like. The cartons of the invention are fabricated of such laminated sheet materials, illustratively paperboard wax-laminated to paper, and will in general be fibrous sheets laminated to each other or to foils with suitable laminating materials as hereinafter more fully described.

In the sheet materials employed for the formation of my heat sealable and especially leakproof cartons, the ability of the laminating adhesive to extrude through slits and raw edges provided in certain preselected areas of the carton construction is essential. When a leakproof or hermetically sealed carton is required, I have found that it is necessary to extrude laminating adhesive through such slits, perforations and edges in sufficient amount not only to heat seal at contiguous surfaces, but also to cover or block the raw cut edges of fibrous sheet materials used in the carton construction to prevent migration by wicking of moisture, water-vapor, liquids, or greases through the closure flaps or seams of the carton construction. Likewise, even when a leakproof carton is not required, as when a "tacked" or "tamperproof" carton is of interest, a satisfactory bond between the carton members desired to be secured requires that a certain minimum quantity of thermoplastic laminant adhesive be present to provide the requisite bodies of adhesive, by extrusion through one or more plies of the carton construction, which are necessary for a satisfactory degree of adhesion.

As thermoplastic adhesive laminant for uniting the plies of laminated sheet materials which are employed in producing the carton blanks and cartons of the present invention, the so-called hot-melt adhesives are preferred. Moisture-vapor-proof hot melts based on petroleum waxes are especially suitable, as these have a high degree of plasticity and flexibility. Hot melts based on microcrystalline waxes are especially preferred. Additional representative laminant adhesives include (A) microcrystalline waxes of any origin, e.g., Louisiana, Pennsylvania, or Mid-Continent origin, and/or paraffin waxes modified with: (1) synthetic polymers such as butyl rubber, polyisobutylene, polyethylene, copolymers of vinyl acetate and ethylene, (2) aluminum stearate, (3) hydrophilic adsorbents, (4) surface activators, (5) terpene resins, (6) ester gums, (7) rosin derivatives, and the like; (B) low molecular weight polymers such as (1) polystyrene of 4,000 to 20,000 M.W., (2) polyethylene of 2,000 to 12,000 M.W., (3) polyterpenes, (4) isoprene polymers, (5) chlorinated natural and synthetic rubbers, (6) natural rubbers, and the like; (C) cellulose derivatives such as (1) ethyl cellulose compositions and mixtures thereof with resins, waxes and plasticizers, (2) nitrocellulose thermoplastics, (3) cellulose acetates or other esters and mixtures thereof with resins and the like; all of which may be suitably modified with various other resins and with plasticizers, according to conventional knowledge and procedure of the art.

The thermoplastic laminating adhesive employed in making the starting laminated sheet material should have the usual flow characteristics of a thermoplastic and may, for example, have a viscosity of at least about 75, and preferably at least about 150, centipoises in the range of from about ten degrees to about fifty degrees Fahrenheit above its softening point, e.g., at a temperature of about 220–270 degrees Fahrenheit, as measured by a Brookfield synchroelectric viscometer or other rotational viscometer at a spindle speed less than ten r.p.m. As previously stated, hot melt compositions based on hydrocarbon and especially petroleum waxes are suitable, preferably those based on microcrystalline waxes, and these may be increased in viscosity by admixture therewith of viscosity builders such as polymers or ethylenically unsaturated hydrocarbons, natural gums, gelling agents, or a hydrous adsorbent powder in combination with a surface activator, especially inorganic gelling agents such as hydrated attapulgite or the like together with nitrogen-containing surface activators, especially fatty-acid amides and alkyl quaternary ammonium salts, or any other viscosity builder indicated previously. The latter type of wax composition, involving combinations of microcrystalline or other hydrocarbon waxes with hydrated adsorbents and long-chain paraffinic surface activators, such as the types mentioned, prepared by expulsion of water of hydration from the adsorbent in the presence of the surface activator, are disclosed in my copending U.S. patent application Serial Number 133,490, filed August 23, 1961, and are preferred because of their thixotropic properties, although it is not essential that these be employed as many others are suitable. The density of the adhesive laminants employed will ordinarily be from about 12 to about 25 or more pounds per ream (24 x 36 x 500) per each .001 inch of thickness thereof.

I have found that there is a limiting lower level of the amount or thickness of the thermoplastic adhesive laminant to be used in the laminated sheets for my carton construction. In general, I have found it desirable to have uninterrupted laminant exceeding the thickness of the base sheet of the laminate around and through which the laminant will be extruded. In any event, however, the adhesive will be present in an amount of at least about fifty-five and preferably at least sixty pounds per ream (24 x 36 x 500 or 3000 square feet). This latter amount is usually sufficient to provide a thickness of laminant in excess of about .004 inch. With this thickness of laminant, there is sufficient adhesive material to extrude through the openings provided in the ply or plies of the flap and/or other carton members, and when present also through the recessed edges of intermediate flap members and into the area of opposed facing relationship between outer and inner flaps in the area of overlap of such intermediate flap or flaps by an outer flap. This amount of laminant is also sufficient to extrude out of the cut edges of top or outer flaps and, if desired, other flaps, thereby to effectively seal the same. However, it is to be understood that greater thicknesses of laminant, even exceeding the combined thickness of the base sheet materials, may be employed if desired. When both sheets are relatively porous, it may be necessary and is frequently advantageous to employ laminant in an amount in excess of the amount necessary to saturate both sheets, which is generally about one fourth of their combined thicknesses.

I have moreover found the laminated sheet materials of my copending U.S. patent application, serial Number 133,521, filed August 23, 1961, ideally suited for use in the construction of heat sealing cartons according to the present invention, although not essentially therefor.

In the heat sealing cartons and carton blanks of the present invention, it is also advantageous to provide a driving force to assist extrusion of the laminating agent into the desired locations for sealing of the carton, especially when a hermetic seal is desired. Ordinarily, the extrusion can be accomplished by heat or heat and pressure alone, whether sealing with or without a mandrel. However, in certain instances, as in providing the top closure tack or seal of a filled package where the application of excessive pressure would distort the package, I have found it desirable to have a heat-activated driving force, such as a volatilizable material, present in the outside ply of the laminated sheet material, that is, in the ply opposite to the ply carrying the openings through which the extrusion of adhesive is desired. This driving force can ordinarily be simply provided by the addition of an aqueously or otherwise deposited coating, such as a clay and/or pigment bound by any one or more of various adhesives of the starch, casein, or latex variety. Certain inks can also be chosen which contain or occlude volatile materials. It is also possible to include driving materials in a sheet material used in the lamination during its production, as in the papermaking step, or to provide sufficiently high moisture content in the paper to provide the desirable driving force during heat sealing. During the heat-sealing step, such materials apparently assist by creation of sufficient vapor pressure to aid in extrusion and redistribution of the laminating adhesive without the application of excessive amounts of external force. Although I do not understand completely all the factors involved, I have found the inclusion of mineral clays in the sheet or in the coating of the sheet, constituting the ply of laminated sheet material opposite to the ply provided with openings into the intercalated thermoplastic laminant adhesive layer, to be particularly effective, especially when an outer flap is involved, in which case the driving force from the volatile material in the upper ply of the outer flap, or in the coating of the outer flap, materially assists in the extrusion of the adhesive through the interstices provided in the inner ply of the flap upon application of heat to the outer ply or surface of such outer flap, and thus cooperates in accomplishing the desired extrusion without application of undesirable pressure to the carton structure. The provision of such a driving material is most simply and conveniently accomplished by including the same in or in a coating on the base sheet material which is to be the outer ply of the formed carton. This embodiment of the invention, e.g., in which mineral clays and/or pigments are employed in combination with the base sheet materials, is especially valuable in cases where two base sheet materials of approximately equal caliper are employed.

Reference is now made to the accompanying drawings which show exemplary embodiments of certain carton blank and carton constructions and arrangements of parts which may be employed according to the invention, without any limitation of the invention thereto, wherein the same numerals refer to the same parts, similar parts of different figures are denoted by like numbers except for a hundred place digit, and wherein:

FIGURE 1 is an enlarged cross-sectional view of a portion of a laminated sheet material utilizable according to the invention.

FIGURE 2 is a plan view showing the printed side of a carton blank embodying the present invention.

FIGURE 3 is a broken plan view showing the reverse or heat-sealing side of the carton blank of FIGURE 2.

FIGURE 6 is a partial plan view of the heat-sealing side of another carton blank embodying the invention.

Figure 4:
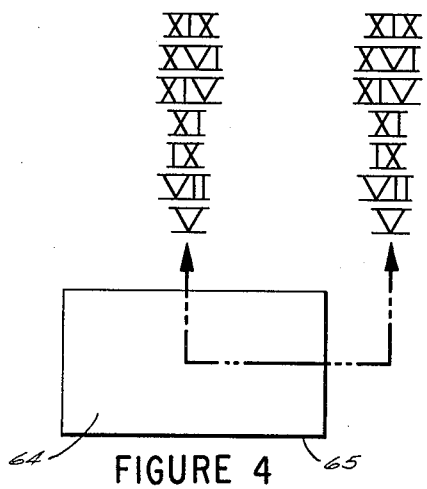
FIGURE 4 is a top or bottom view of any erected and sealed carton constructed in accord with the invention.

Referring now to the drawings, FIGURE 1 is an enlarged cross-sectional view of a portion of a laminated sheet material 10 utilizable according to the invention, as it might be formed by laminating a fifty pound per ream (24 x 36 x 500) 0.0035 inch thick dry waxed paper sheet 11 to a .012 inch thick paperboard sheet 13 with .0065 inch of thermoplastic laminating adhesive 12, as shown in Example 1 following.

FIGURE 2 shows a plan view of the outer printed side of carton blank 20 embodying the invention, as viewed having the thicker or paperboard plie 13 of laminated sheet material 10 facing the viewer. The generally rectangular precut blank 20 includes rectangular front face panel 21, rectangular back face panel 22, rectangular right hand end panel 23, and rectangular left hand end panel 24 between front face panel 21 and back face panel 22. Glue flap 25 is adjacent to and integral with back face panel 22.

Blank 20 includes front bottom flap 26, back bottom flap 27, and bottom end flaps 28 and 29, all adjacent to and integral with the front, back, and end panels respectively. The blank is also provided with front top flap 31, back top flap 32, and top end flaps 33 and 34, all respectively adjacent to and integral with the front, back, and end panels. Glue flap 25 is provided with bottom and top extensions 30 and 35, which in the assembled carton are attached to and fold with bottom and top end flaps 28 and 33, respectively.

Blank 20 is scored to provide fold line 36 between front face panel 21 and right hand end panel 23 and to provide fold line 37 between front face panel 21 and left hand end panel 24 and to provide fold line 38 between back face panel 22 and left hand end panel 24 and fold line 39 between back face panel 22 and glue flap 25. Score or fold lines 36 through 39 are all parallel and extend transversely across blank 20.

Blank 20 is also scored longitudinally in spaced relation to one edge thereof to provide fold line 40 between front face panel 21 and front bottom flap 26, fold line 41 between back face panel 22 and back bottom flap 27, and fold lines 42 and 43 between end panels 23 and 24 and end bottom flaps 28 and 29, respectively. The blank is moreover provided with transverse cuts between its edge and the longitudinal fold line formed by score lines 40 through 43 between bottom flaps 26 and 28, 26 and 29, 27 and 29, and between back bottom flap 27 and extension 30, to permit the bottom flaps to be folded inwardly at right angles with respect to their adjacent panels.

Still referring to FIGURE 2, the carton blank 20 is also scored longitudinally in spaced relation to its opposite edge to provide a fold line 45 between front face panel 21 and front top flap 31, to provide fold line 46 between back face panel 22 and back top flap 32, and to provide fold lines 47 and 48 between end panels 23 and 24 and top end flaps 33 and 34. The blank is moreover provided with transverse cuts extending from its edge to the fold lines between top flaps 31 and 33, 31 and 34, 32 and 34, and between back top flap 32 and extension 35, to permit the top flaps to be folded inwardly at right angles with respect to their adjacent panels.

As shown, end flaps 28, 29, 33 and 34 have a lateral reach which is slightly less than that of front and back top flaps 26, 27, 31 and 32, but which lateral reach is approximately one-half the width of front top and bottom flaps 26 and 31.

Glue flap 25 is joined to back face panel 22 along fold line 39 and is also scored in spaced relation to its edges to provide fold lines 44 and 49, which are respectively extensions of fold lines 41 and 46, along which fold lines 44 and 49 glue flap 25 is joined to its bottom and top extensions 30 and 35, respectively.

As will be noted from FIGURE 2, back bottom flap 27 and back top flap 32 are recessed or partially cut away at their lateral edges 50 and 51 and 52 and 53, respectively, making these flaps of lesser width and area than front top and bottom flaps 26 and 31, and as shown have a curved reach 54 in each of their lateral edges so as to impart a taper thereto. These flaps 27 and 32 are of full width at their respective junctures with back face panel 22 along score lines 41 and 46, but of reduced width at their longitudinal edge. The "tapered" aspect of back bottom and top flaps 27 and 32, in which said flaps are of a diminished width with respect to front top and bottom flaps 26 and 31, constitutes a preferred manner of construction of the flaps.

As viewed in FIGURE 2, printed text or legend is present on front and back face panels 21 and 22, as at 55, on right and left hand end panels 23 and 24, as at 56, and on front top and bottom flaps 26 and 31, as at 57, all in register with the various score lines, cuts, and panels.

Referring now to FIGURE 3, which is a broken plan view showing the reverse or heat-sealing side of carton blank 20 (of FIGURE 2), as viewed showing thinner ply 11 of laminated sheet material 10 facing the viewer, all of the members of the carton blank observed from FIGURE 2 are also apparent in FIGURE 3, in their reverse position, and are identically numbered.

Figure 13:
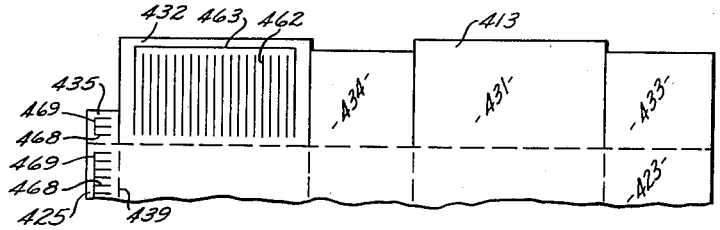
FIGURE 13 is a partial plan view of the outer or reverse side of the carton blank of FIGURE 12, also having heat-sealing areas.
Figure 18:
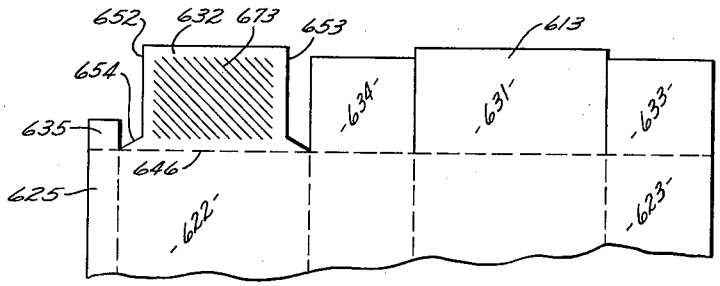
FIGURE 18 is a partial plane view of the outer or reverse side of the carton blank of FIGURE 17, also having a heat-sealing area.

Still referring to FIGURE 3, in addition to all the elements except the printed indicia observed from FIGURE 2, there will be seen transverse slits 60 and longitudinal slit 61 in each of front bottom and top flaps 26 and 31 and corresponding slits 62 and 63 in back bottom and top flaps 27 and 32, which slits extend through thinner or paper ply 11 of laminated sheet material 10 from which carton blank 20 is constructed (see FIGURE 1). while as shown in FIGURE 3 the inner ply 11 of laminated sheet material 10 is the thinner of the several plies making up laminated sheet material 10, it is not essential that the inner sheet receiving slits or cuts 60 through 63 should be the thinner ply, as it could also be the thicker ply, for example 13 in FIGURE 1 (see FIGURES 13 and 18). As shown in FIGURE 3, slits or cuts 60 through 63 extend through thinner or paper ply 11, providing interstices or openings in ply 11 from the inner layer of thermoplastic adhesive laminant 12 (see FIGURE 1) to the exterior of sheet or ply 11.

FIGURE 4 is a top or bottom view of any erected and sealed carton constructed in accord with the present invention, and is included solely for purposes of providing a cutting line upon which the cross-sectional views of subsequent figures may be taken. When viewed from the top or bottom, as in FIGURE 4, an erected and sealed carton constructed in accord with the present invention has substantially no different appearance than any other conventional carton. The top or bottom of any erected and sealed carton constructed in accord with the invention is shown in FIGURE 4 as 64, and the front face panel of any such carton is indicated at 65. For purposes of the following FIGURE 4 will be considered a top view.

Figure 5:
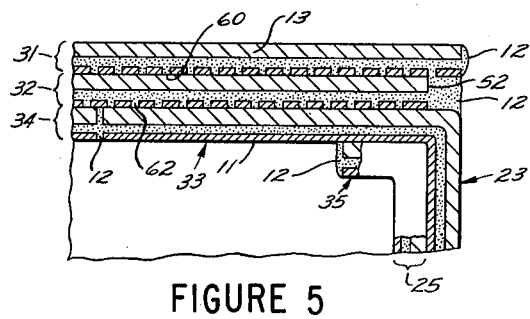
FIGURE 5 is an exaggerated cross-sectional view on line V—V of FIGURE 4, considering FIGURE 4 a top view, showing one version of the erected and sealed carton, having been erected from the carton blank of FIGURES 2 and 3, with a part thereof shown in broken elevation.

FIGURE 5 is an exaggerated cross-sectional view on line V—V of FIGURE 4, showing a carton according to the invention, having been erected from the carton blank of FIGURES 2 and 3 and sealed.

From FIGURE 5 can be seen left hand end flap 34, right hand end panel 23 with its end flap 33, back top flap 32, left hand end flap 34, and front top flap 31, each with paperboard ply 13 and paper ply 11 and layer of intercalated adhesive laminant 12. Glue flap 25 and extension 35 are also apparent. Interstices 60 and 62 in paper ply 11 of front top flap 31 and back top flap 32 are apparent. Thermoplastic adhesive laminant 12 from front top flap 31 and back top flap 32 has extruded respectively through interstices 60 and 62 forming respective bonds between upper or paperboard ply 13 of front top flap 31 with upper or paperboard ply 13 of back top flap 32 and between upper or paperboard ply 13 of back top flap 32 with upper or paperboard ply 13 of end flap 33. Adhesive 12 from front top flap 31 has also extruded outwardly at the cut edge of front top flap 31, forming a seal over both paperboard 13 and paper 11 plies of top flap 31 at their respective cut edges. Due to recessed edge 52 of back top flap 32, adhesive 12 from front top flap 31 and back top flap 32 has extruded downwardly and outwardly to form a direct bond between upper or paperboard ply 13 of top flap 31 and upper or paperboard ply 13 of end flap 33, thereby also sealing off the cut edges of plies 11 and 13 of back top flap 32 at flap edge 52. No cut edges are exposed for wicking, but all are sealed off by thermoplastic laminant 12. Front top flap 31 is bonded not only to back top flap 32 by adhesive 12 through interstices 60 but back top flap 32 is likewise bonded to end flap 33 by adhesive 12 through interstices 62, and front top flap 31 is bonded directly to end flap 33 through adhesive 12 which has extruded through interstices 60 and through cut edge 52 of back top flap 32. Interior of the carton body, adhesive 12 has extruded out of the cut edges of end flaps 33 and 34, thereby forming a bond between them and with back top flap 32 from which additional thermoplastic laminant adhesive may extrude through interstices 62. Under sufficient heat or heat and pressure, laminant 12 may also extrude out of and seal the cut edge of glue flap extension 35.

In FIGURE 6 is shown a partial plan view of the heat-sealing side of another carton blank embodying the invention, formed from laminated sheet material 110, with thinner or paper ply 111 facing the viewer. Blank 120 includes front face panel 121, back face panel 122, right hand end panel 123, and left hand end panel 124. Parallel transverse score lines 136, 137, 138, and 139 are respectively between front face panel 121 and right hand end panel 123, between front face panel 121 and left hand end panel 124, between back face panel 122 and left hand end panel 124, and between back face panel 122 and glue flap 125. Front top flap 131 is integral with and attached to front face panel 121 along longitudinal score line 145, back top flap 132 is integral with and attached to back face panel 122 along longitudinal score line 146, and right hand and left hand top flaps 133 and 134 are integral with and respectively attached to right hand and left hand end panels 123 and 124 along longitudinal score lines 147 and 148. Glue flap 125, which is integral with and attached to back face panel 122 along transverse score line 139, is also integral with and attached to extension 135 along longitudinal score line 149. All of the longitudinal score lines are extensions of each other. Transverse cut are also provided between the edge of blank 120 and longitudinal fold line formed by score lines 145 through 149 between top flaps 131 and 133, 131 and 134, 132 and 134, and between 132 and extension 135, to permit the flaps to be folded inwardly at right angles with respect to their adjacent panels. Back top flap 132 is again recessed or cut away at its lateral edges 152 and 153 so as to be of diminished width at its longitudinal edge, with respect to back face panel 122, but being of full width at its juncture with back face panel 122 along score line 146, and angled along each of lateral edges 152 and 153, as at 154, so as to impart a longitudinal edge of flap 131. Transverse cuts 160 are provided in paper ply 111 of front top flap 131 as is longitudinal slit or cut 161 in spaced relation to the longitudinal edge of flap 131. Tranverse cuts 160 are parallel and extend from their origins equally spaced from longitudinal cut 161 to their parallel termini all equally spaced from score line 145.

Figure 7:
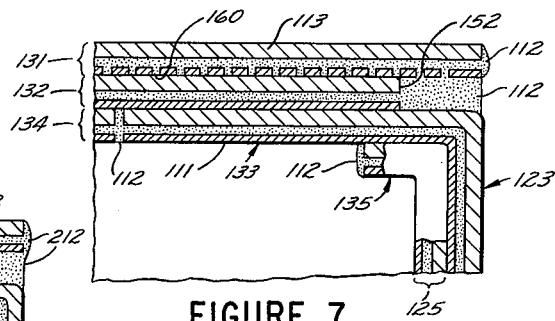
FIGURE 7 is an exaggerated cross-sectional view on line VII—VII of FIGURE 4, considering FIGURE 4 a top view, showing another form of the erected and sealed carton, having been erected from the carton blank of FIGURE 6, with a part thereof shown in broken elevation.

FIGURE 7, an exaggerated cross-sectional view on line VII—VII of FIGURE 4, shows a carton erected from the carton blank of FIGURE 6 and sealed. From FIGURE 7 can be seen right hand end panel 123 with its end flap 133, left hand end flap 134, back top flap 132, and front top flap 131, each with its paperboard ply 113 and paper ply 111 together with intercalated thermoplastic adhesive laminant 112. Glue flap 125 with extension 135 are also apparent. Interstices 160 in paper ply 111 of front top flap 131 are apparent, and adhesive 112 from top flap 131 has extruded through interstices 160 forming a bond with the upper or paperboard ply 113 of back top flap 132. Adhesive 112 has also extruded downwardly through interstices 160 in front top flap 131 and outwardly at cut edge 152 of back top flap 132, as well as outwardly at the cut edge of front top flap 131, forming a seal over both paperboard 113 and paper plies 111 of front top flap 131 and back top flap 132 at their respective cut edges. Due to recessed lateral edge 152 of back top flap 132, adhesive 112 forms a direct bond between upper or paperboard ply 113 of front top flap 131 and upper or paperboard ply 113 of end flap 133. No cut edges are exposed for wicking, all cut edges are sealed off by adhesive 112, and top flap 131 is bonded by adhesive 112 not only to back top flap 132 through interstices 160 but also directly to end flap 133. Interior of the carton body, adhesive 112 has extruded out of cut edges of end flaps 133 and 134, thereby sealing off these cut edges and securing them to each other and to back top flap 132. Under sufficient heat and pressure, adhesive 112 may also extrude out of the cut edges of glue flap extension 135, thereby also sealing off the same.

Figure 8:
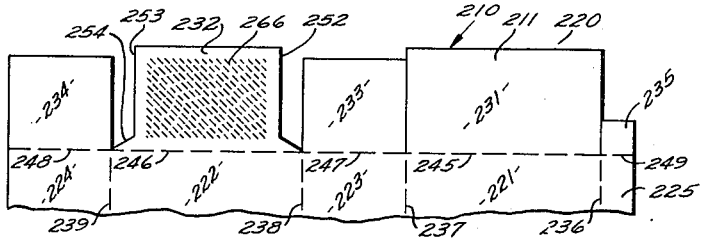
FIGURE 8 is a partial plan view of one side of another carton blank embodying the invention.

Referring now to FIGURE 8, this partial plan view of one side of another carton blank embodying the invention shows thinner or paper ply 211 of carton blank 220 constructed from laminated sheet material 210 facing the viewer. Transverse score line 236 separates front face panel 221 and glue flap 225, score line 237 separates front face panel 221 and right hand end panel 223, while score line 238 separates back face panel 222 from right hand end panel 223 and score line 239 lies between back face panel 222 and left hand end panel 224. All transverse score lines are parallel and all panels are rectangular. Front top flap 231, which will be the top or outer flap in the erected carton, back top flap 232, which will underlie front top flap 231 in the erected carton, and right hand and left hand top flaps 233 and 234, the end flaps, are all shown, as are glue flap 225 and its extension 235. Longitudinal score lines 245, 246, 247, 248, and 249 are all extensions of each other and are disposed in spaced relation to the edge of blank 220. The usual transverse cuts are provided between the edge of blank 220 and the longitudinal score lines between front top flap 231 and right hand top flap 233, between front top flap 231 and extension 235, and between back top flap 232 and end flaps 233 and 234. Back top flap 232 is again shown as recessed or cut away at its lateral edges 252 and 253 which are angled as at 254 to provide a width of back top flap 232 at score line 246 which is the same as the width of back face panel 222, although of diminished width at the longitudinal edge of flap 232. Back top flap 232 is provided with minute (e.g., 1/16 inch in length) perforations 266, diagonally disposed in flap 232 in spaced relation to its edges, which are slits or cuts which penetrate not only inner ply 211 of sheet material 210, but also the layer of adhesive 212 (not shown) and outer ply 213 (not shown) on the opposite side of the sheet material 210. In this manner back top flap 232 is provided with perforations or holes which extend from one face of flap 232 to the other.

Figure 9:
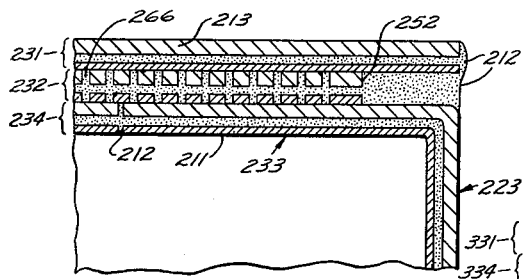
FIGURE 9 is an exaggerated cross-sectional view on line IX—IX of FIGURE 4, considering FIGURE 4 a top view, showing another form of the erected and sealed carton, having been erected from the carton blank of FIGURE 8, with a part thereof shown in broken elevation.

FIGURE 9 shows an exaggerated cross-sectional view of a carton erected from the carton blank of FIGURE 8 and sealed. From FIGURE 9 are seen front top flap 231, back top flap 232, and end flaps 233 and 234, end flap 233 being attached to right hand end panel 223. Thermoplastic laminant adhesive 212 has been extruded by the application of heat, or heat and pressure, through the interstices 266 in both paperboard 213 and paper plies 211 of back top flap 232 and through the cut edge 252 of back top flap 232, thereby effectively sealing upper ply 213 of back top flap 232 to bottom ply 211 of front top flap 231, sealing the bottom ply 211 of back top flap 232 to top ply 213 of end flaps 233 and 234, sealing the bottom ply 211 of front top flap 231 to top ply 213 of end flap 233 through interstices 266 and also directly in the area in which top flap 231 overhangs back top flap 232 outside its recessed lateral edge 252. Adhesive 212 has also been extruded through the cut edge of top flap 231, and from the cut edges of end flaps 233 and 234 which are joined by extruded adhesive 212 to each other and to flap 232, thereby sealing off all cut edges against wicking and securely binding all of the closure members or flaps of the carton to each other.

Figure 10:
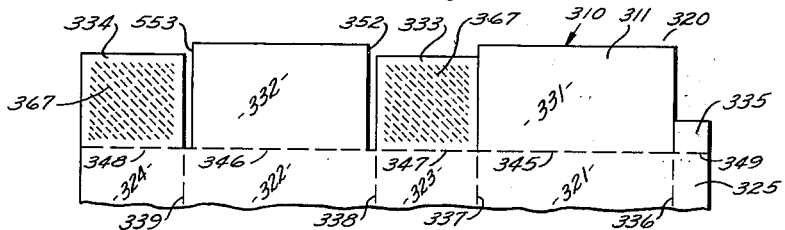
FIGURE 10 is a partial plan view of one side of another carton blank embodying the invention.

The carton blank 320 shown in partial plan view with paper ply 311 of laminated sheet material 310 facing the viewer in FIGURE 10 illustrates a different embodiment of the invention and is otherwise similar to the carton blanks of previous figures. Front face panel 321 and back face panel 322 are joined to right hand end panel 323 along parallel transverse score lines 337 and 338, respectively, and front face panel 321 is joined along transverse score line 336 to glue flap 325, while back face panel 322 is joined along transverse score line 339 to left hand end panel 324. Rectangular face and end panels are joined to their respective top flaps along longitudinal score lines 345 through 348, and glue flap 325 is joined to its extension 335 along score line 349, all of which score lines 345 through 349 are extensions of each other. Front top flap 331, back top flap 332, and end flaps 333 and 334 are all joined to their respective front, back and end panels along said longitudinal score lines, and are separated from each other by the usual transverse cuts extending from the longitudinal edge of blank 320 to said longitudinal score lines. Front top flap 331 is also separated from extension 335 by such transverse cut. Right hand and left hand end flaps 333 and 334 are provided with generally diagonally arranged perforations 367, in the form of slits or cuts which extend through the surface of the inner or paper ply 311 facing the viewer through the intercalated layer of adhesive 312 (not shown) and through the surface of the outer or paperboard ply 313 (not shown), that is, from one face of flaps 333 and 334 to the other. These flaps 333 and 334 are shown as having a lateral reach approximately one-half the longitudinal width of front top flap 331. Back top flap 332 is again of diminished width in contrast to top flap 331, in this case being recessed or cut-back at each of its lateral edges 352 and 353 so as to be of a lesser width throughout its entire lateral reach than back face panel 322 to which it is joined along score line 346 to permit it to fold inwardly of the carton end panels 323 and 324 (as shown in FIGURE 11).

Figure 11:
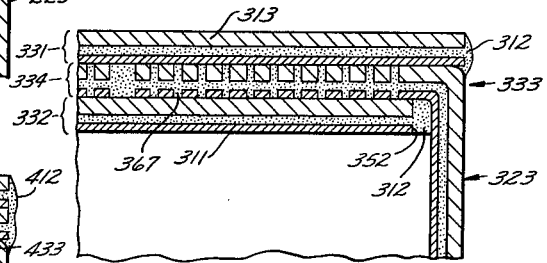
FIGURE 11 is an exaggerated cross-sectional view on line XI—XI of FIGURE 4, considering FIGURE 4 a top view, showing a further form of the erected and sealed carton, having been erected from the carton blank of FIGURE 10, with a part thereof shown in broken elevation.

An exaggerated cross-sectional view, along line XI—XI of FIGURE 4, of a carton erected from the carton blank of FIGURE 10 and then sealed, is shown in FIGURE 11. In this case, back top flap 332 is innermost of the closure flaps, and front top flap 331 as usual uppermost. End flaps 333 and 334 are folded upon back top flap 332 and directly underlie front top flap 331. Upon sealing by the application of heat or heat and pressure, thermoplastic laminant adhesive 312 has been extruded out of the interstices 367 in both plies of end flaps 333 and 334, thus forming a bond between lower ply 311 of front top flap 331 and top ply 313 of back top flap 332 through interstices 367 in end flaps 333 and 334, as well as between upper ply 313 of end flaps 333 and 334 and lower ply 311 of front top flap 331, and that adhesive 312 has likewise formed a bond between upper ply 313 of back top flap 332 and lower ply 311 of end flaps 333 and 334. Adhesive 312 has also extruded outwardly through the cut lateral edge 352 of back top flap 332, thereby forming a bond with inner ply 311 of right hand end panel 323, and has likewise extruded outwardly from front top flap 331 to form a seal over the cut edges of both plys 311 and 313 of front top flap 331, thus sealing the said carton edges off against wicking, the various closure members being otherwise securely sealed to each other. At the juncture between end flaps 333 and 334, adhesive 312 has extruded from the cut edges, forming a bond therebetween.

Figure 12:
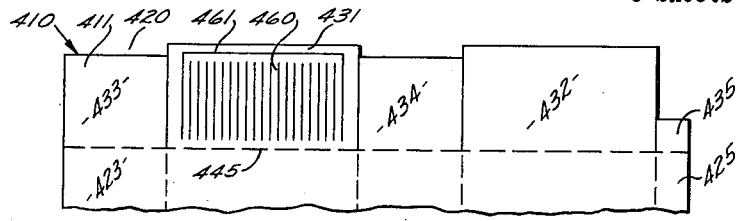
FIGURE 12 is a partial plan view of the inner or heat-sealing side of another carton blank embodying the invention.

FIGURES 12 and 13 are partial plan views of the two sides of another carton blank 420 embodying the invention, showing respectively the inside of the carton as it will be formed with paper ply 411 of laminated sheet material 410 facing the viewer in FIGURE 12 and with paperboard ply 413 facing the viewer in FIGURE 13.

The various parts of blank 420 as shown in FIGURE 12 correspond to those shown for carton blank 20 in FIGURE 3 and the various parts of carton blank 420 shown in FIGURE 13 correspond to those shown for carton blank 20 in FIGURE 2, except for the heat-sealing areas and the fact that the lateral edges of back top flap 432 are not recessed.

Transverse cuts or slits 460 are provided in paper ply 411 of front top flap 431 as is longitudinal slit or cut 461 located in spaced relation to the longitudinal edge of flap 431. Transverse cuts 460 are parallel and extend from their origins equally spaced from longitudinal cut 461 to parallel termini all equally spaced from score line 445. The transverse cuts 460 closest to the lateral edges of flap 431 extend into and are integral with longitudinal cut or slit 461.

In FIGURE 13, transverse cuts 462 and longitudinal cut 463 are provided in paperboard ply 413 of back top flap 432 in exactly the same manner as given for transverse cuts 460 and longitudinal cut 461 in paper ply 411 of front top flap 431. In addition, parallel transverse cuts 468 are provided in paperboard ply 413 of glue flap 425 and extend from longitudinal slit or cut 469, which is also provided in paperboard ply 413 of side seam glue flap 425, being located in spaced relation to the longitudinal edge of flap 425 and extending throughout substantially its entire length. Transverse cuts 468 terminate in their parallel termini equally distant from and located in spaced relation to score line 439. Exactly the same type of cuts or slits 468 and 469 are provided in extension 435. End flaps 433 and 434 and right hand end panel 423 are also shown.

Figure 14:
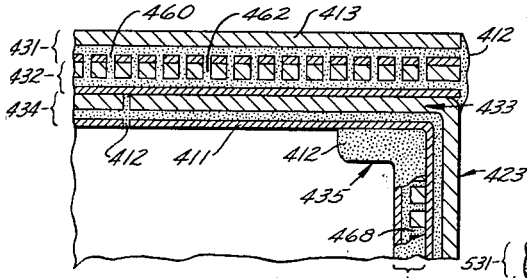
FIGURE 14 is an exaggerated cross-sectional view on line XIV—XIV of FIGURE 4, considering FIGURE 4 a top view, showing an additional form of the erected and sealed carton, having been erected from the carton blank of FIGURES 12 and 13, and with a part thereof shown in broken elevation.

An exaggerated cross-sectional view of a carton erected from the carton blank of FIGURES 12 and 13 and sealed by the application of heat or heat and pressure, taken along line XIV—XIV of FIGURE 4, is shown in FIGURE 14.

From FIGURE 14 may be seen front top flap 431 superimposed upon back top flap 432, which is in turn superimposed upon end flaps 433 and 434. Thermoplastic laminant adhesive 412 has been extruded through interstices 460 in paper ply 411 of front top flap 431 and through interstices 462 in paperboard ply 413 of back top flap 432, thereby integrally interbonding both front top flap 431 and back top flap 432 and their respective upper ply 413 and lower ply 411 through interstices 460 and 462. Adhesive 412 has also extruded from the cut edges of front top flap 431 and back top flap 432, thereby sealing said edges off against wicking. A portion of adhesive 412 has also extruded outwardly from the cut edges of flaps 431 and 432, further bonding these two flaps with paperboard ply 413 of right hand end panel 423. Adhesive 412 has also been extruded out of the cut edges of end flaps 433 and 434, thereby forming a bond therebetween and also between them and lower or paper ply 411 of back top flap 432. Flap 425 and its extension 435 are also apparent, and the partially broken elevational view of the edge of said flap shows adhesive 412 extruded through interstices 468 in paperboard ply 413 of flap 425, thereby forming an adhesive bond between flap 425 and inner or paper ply 411 of end panel 423. In the process of sealing flap 425 to the inside of end panel 423 involving the application of heat or heat and pressure, adhesive 412 has been extruded out of the cut edges of flap 425 and extension 435 throughout their entire lengths, sealing them against any possible wicking, as seen in FIGURE 14. In this embodiment, interstices 468 and 469 may be absent from flap 425 and corresponding interstices provided in the inner or paper ply 411 of end panel 423 immediately adjacent its edge along which it is adhered to flap 425, or the interstices may be present in both flap 425 and panel 423. Similarly, interstices 468 and 469 may be absent from extension 435 but present in the inner or paper ply 411 of top flap 433 immediately adjacent its edge along which it is adhered to extension 435, or the interstices may be present in both extension 435 and flap 433.

Figure 15:
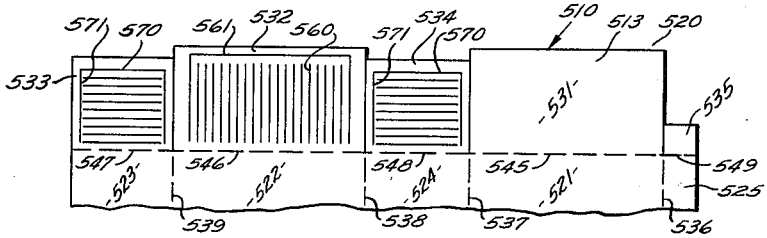
FIGURE 15 is a partial plan view of the outer and heat-sealing side of another carton blank embodying the invention.

FIGURE 15 shows a partial plan view of a carton blank 520 formed from laminated sheet material 510 with thicker or paperboard ply 513 facing the viewer. The panels, flaps, and extensions of this carton blank are defined by longitudinal score lines in spaced relation to the edge of said blank, and by the parallel transverse score lines. Thus, front face panel 521 is joined with glue flap 525 and with left hand end panel 524 along score lines 536 and 537 respectively, while back face panel 522 is joined with left hand end panel 524 and right hand end panel 523 along score lines 538 and 539, respectively. Front face panel 521 is joined with its front top flap 531 along longitudinal score line 545, back face panel 522 is joined with its back top flap 532 along longitudinal score line 546, end panels 523 and 524 are respectively joined to their end flaps 533 and 534 along longitudinal score lines 547 and 548, and glue flap 525 is joined to its extension 535 along longitudinal score line 549, said longitudinal score lines all being extensions of each other. Usual transverse cuts extend from the edge of blank 520 to the longitudinal score line between top flap 531 and extension 535 and left top flap 534, and between back top flap 532 and right hand and left hand end flaps 533 and 534. Transverse cuts 560 are also provided in paperboard ply 513 of back top flap 532, as is longitudinal slit 561 located in spaced relation to the longitudinal edge of flap 532. Cuts 570 are provided in paperboard ply 513 of each of end flaps 533 and 534, as well as slits 571 in spaced relation to the lateral edges of flaps 533 and 534. Cuts 560 are all parallel to each other and extend from their origins equally spaced from slit 561 to their parallel termini, all equidistant from and in spaced relation to score line 546, while cuts 570 are parallel and extend between slits 571.

Although in FIGURE 15 the transverse and longitudinal cuts are shown in paperboard ply 513 of back top flap 532, these cuts could be absent from back top flap 532 and present in thinner or paper ply 511 (not shown) of front top flap 531. Moreover, back top flap 532 may be and preferably is cut away or recessed at its lateral edges.

Figure 16:
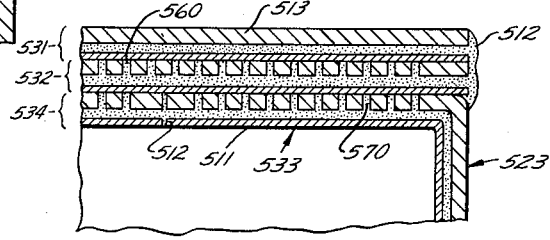
FIGURE 16 is an exaggerated cross-sectional view on line XVI—XVI of FIGURE 4, considering FIGURE 4 a top view, showing a further form of the erected and sealed carton, having been erected from the carton blank of FIGURE 15, with a part thereof shown in broken elevation.

FIGURE 16 shows an exaggerated cross-sectional view on line XVI—XVI of FIGURE 4 of a carton erected from the carton blank of FIGURE 15 and sealed by the application of heat or heat and pressure.

As viewed in FIGURE 16, front top flap 531, back top flap 532, and end flaps 533 and 534 are apparent, 531 overlying 532 which in turn overlies both end flaps 533 and 534. End panel 523 of which flap 533 is an extension is also shown. Thermoplastic laminant adhesive 512 has been extruded through interstices 560 in paperboard ply 513 of back top flap 532 to form a bond between back top flap 532 and the lower or paper ply 511 of front top flap 531. Likewise, adhesive 512 has extruded through interstices 570 in paperboard ply 513 of end flaps 533 and 534, forming a bond at the upper surface of said end flaps with the lower surface of back top flap 532. Adhesive 512 has also extruded outwardly from front top flap 531 and underlying back top flap 532, forming a protective layer over the cut edges of the various plies of these flaps to prevent wicking, and also bonding these flaps to outer or paperboard ply 513 of end panel 523. Adhesive 512 has also extruded outwardly from the cut edges of end flaps 533 and 534, bonding these flaps together interiorly of the carton and also bonding the cut ends of these flaps to the lower surface of back top flap 532.

Figure 17:
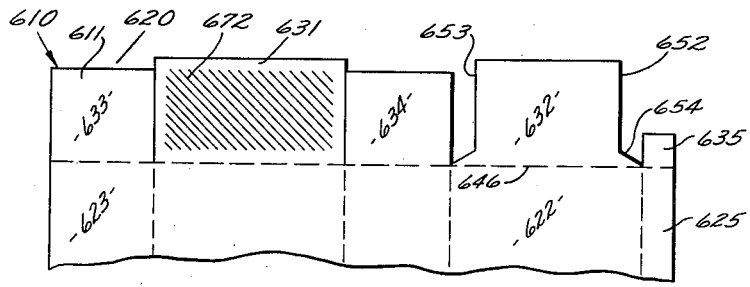
FIGURE 17 is a partial plan view of the inner or heat-sealing side of still another carton blank embodying the invention.

FIGURE 17 is a partial plan view of one side of another carton blank 620 embodying the invention, while FIGURE 18 is a partial plan view of the reverse side of the same carton blank. In FIGURE 17 thinner or paper ply 611 of sheet material 610 faces the viewer, while in FIGURE 18 thicker or paperboard ply 613 faces the viewer. The various parts of carton blank 620 as shown in FIGURE 17 correspond with those shown for carton blank 20 in FIGURE 3; the various parts of carton blank 620 shown in FIGURE 18 correspond with those shown for carton blank 20 in FIGURE 2, with the exception of the heat-sealing areas. Back top flap 632 is again shown as recessed or cut away at its edges 652 and 653, so as to provide a width at its longitudinal edge which is less than the width of its adjoining back face panel 622 throughout most of its lateral reach, but is angled as at 654 so as to provide a width at score line 646 which is the same as that of back face panel 622. As shown in FIGURE 17, front top flap 631 is provided with cuts 672 in paper ply 611, diagonally disposed in spaced relation to the lateral and longitudinal edges of front top flap 631, which slits or cuts penetrate only the inner or paper ply 611 of sheet material 610. Likewise, as shown in FIGURE 18, similar diagonally disposed cuts 673 in paperboard ply 613 of back top flap 632 are also provided and are similarly located in spaced relation to the longitudinal and lateral edges of back top flap 632. End panel 623, end flaps 633 and 634, and glue flap 625 and its extension 635 are also apparent in FIGURES 17 and 18.

Figures 19, 20:
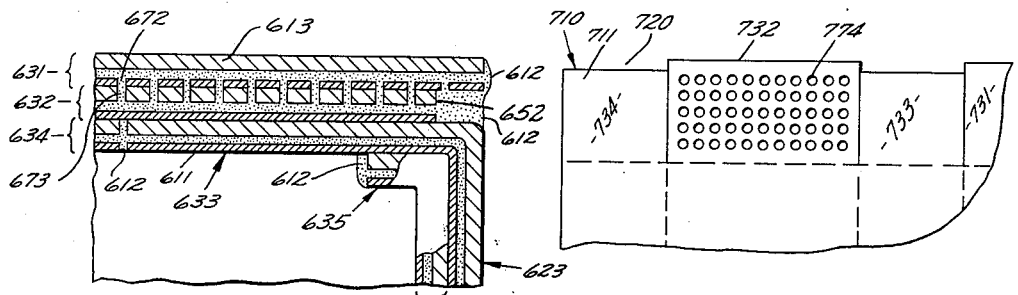
FIGURE 19 is an exaggerated cross-sectional view taken on line XIX—XIX of FIGURE 4, considering FIGURE 4 a top view, illustrating yet another form of the erected and sealed carton, having been erected from the carton blank of FIGURES 17 and 18, showing the intersections of the diagonal cuts in the flaps of the carton blank of FIGURES 17 and 18, and with a part thereof in broken elevation.
FIGURES 20 and 21 are partial plan views of additional carton blanks embodying the invention.

FIGURE 19 shows an exaggerated partial cross-sectional view on line XIX—XIX of FIGURE 4 of a carton erected from the carton blank of FIGURES 17 and 18 and sealed by the application of heat or heat and pressure. As viewed in FIGURE 19 at the intersections of the diagonal cuts 672 and 673, front top flap 631, back top flap 632, and end flaps 633 and 634 are visible, flap 631 overlying flap 632 which in turn overlies both end flaps 633 and 634. End panel 623 of which flap 633 is an extension, and glue flap 625 and its extension 635 are also shown. Thermoplastic laminant adhesive 612 has extruded through interstices 672 in paper ply 611 of front top flap 631 and through interstices 673 in paperboard ply 613 of back top flap 632, thereby integrally bonding front top flap 631 and back top flap 632 together. Since this cross-sectional view is taken at an intersection of the reverse diagonal cuts 672 and 673 of front top flap 631 and back top flap 632, interstices 672 and 673 are shown in alignment, it being understood that they will be out of alignment except in a view taken at an intersection of the diagonal cuts 672 and 673. Adhesive 612 has also extruded outwardly from the edge of front top flap 631 and back top flap 632, especially at lateral edge 652, thereby sealing off said edge and forming an area of adhesive 612 directly between bottom ply 611 and top ply 613 of front top flap 631 and top ply 613 of end flap 633 in the area of overhang of back top flap 632 by front top flap 631, and also sealing the cut edge of front top flap 631 against wicking. Interior of the carton, adhesive 612 has extruded from the facing edges of end flaps 633 and 634, bonding them together and to the lower ply 611 of back top flap 632. Adhesive 612 also extrudes outwardly from the cut edge of extension 635 of glue flap 625, further sealing this edge against wicking, when heat or heat and pressure applied in sealing are of sufficient magnitude. Thus, all exposed edges of the sealed carton shown in FIGURE 19 are sealed by adhesive 612 against wicking at their edges and all flaps are securely sealed to each other.

Figure 21:
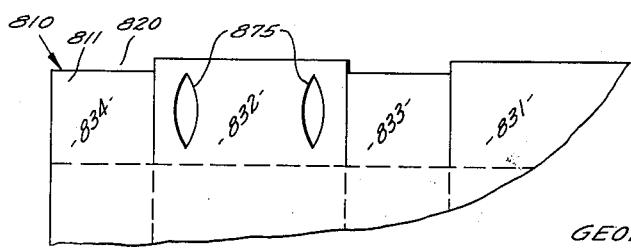

FIGURES 20 and 21 are partial plan views of carton blanks designated 720 and 820 showing inside or paper plies 711 and 811 of laminated sheet materials 710 and 810, from which the blanks are respectively constructed, facing the viewer. The carton blanks 720 and 820 have all of the various parts shown in FIGURE 8, but heat sealing flaps 732 and 832 in the carton blanks of FIGURES 20 and 21, and the heat sealing areas therein, are of a different design than those shown in FIGURE 8, although both involve perforations.

In FIGURE 20, back top flap 732 is provided with punched or drilled holes 774 extending through both of its outer plies, that is from ply 711 through adhesive 712 and paperboard ply 713 (neither of which latter two plies are shown). These drilled or punched holes 774 through back top flap 732 operate in the same way as the perforations 266 in the carton blank of FIGURE 8 upon application of heat or heat and pressure to provide an effective sealing of the carton in the same manner as the carton blank of FIGURE 8 is sealed (see FIGURE 9), except that front top flap 731 will not bond directly to end flaps 733 and 734 at its lateral edges since back top flap 732 has no recessed edge and will lie thereinbetween.

In FIGURE 21, back top flap 832 is provided with two double convex elliptical cutouts 875 in spaced relation to its lateral edges which provide a means through which, upon erecting of the carton, closing and sealing the same, as by the application of heat or heat and pressure, the lower face of front top flap 831 is sealed directly by thermoplastic adhesive laminant 812 (not shown) extruding out of the edges of cutouts 875 to the upper surface of end flaps 833 and 834, substantially in the manner indicated by FIGURE 9 for the carton blank of FIGURE 8, except that front top flap 831 will not bond directly to end flaps 833 and 834 at its lateral edges since back top flap 832 has no recessed edge and will lie thereinbetween.

Cutouts 875 in back top flap 832 need not be elliptical, nor double convex, but may take any desired shape or form or number of at least one, or two as shown in FIGURE 21, or more, as shown for the circular punchouts 774 in back top flap 732 of FIGURE 20, or many more as shown for the perforations 266 in back top flap 232 of FIGURE 8.

Figure 22:
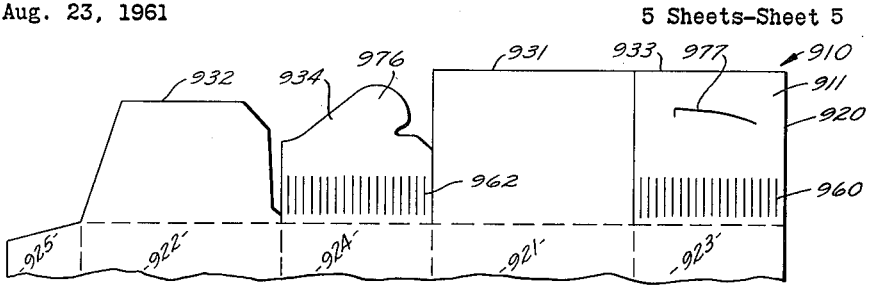
FIGURES 22 through 25 are partial plan views of additional carton blanks embodying the invention, in which the carton blanks are viewed from their inner or heat-sealing side.

FIGURE 22 shows another carton blank embodying the invention, in which face and end panels and glue flaps 921 through 925 are all partially visible. Front top flap 931 has dimensions corresponding substantially to an end cross section of the carton to be erected from the blank, while back top flap 932 is cut away at its outer and lateral edges. Right hand end flap 934 is provided with hook (or male lock member) 976 adapted to be inserted in eye (or female lock member) 977 of rectangular left hand end flap 933. Carton blank 920 of FIGURE 22 is formed from laminated sheet material 910 with thinner or paper ply 911 facing the viewer, and slits 960 and 962 respectively in end flaps 933 and 934 are provided only in thinner or paper ply 911. Slits 960 and 962 in thinner or paper ply 911 of end flaps 933 and 934, respectively, are located adjacent the score line along which these end flaps adjoin their respective end panels. Upon erecting a carton from this carton blank and folding end flaps 931, 932, 933, and 934 in that order, with insertion of hook 976 into eye 977, and subsequent application of heat and/or heat and pressure to the end of the carton at its side edges, a sealed carton, adequately sealed along two edges but closed centrally by means of the hook 976 and eye 977 and thus adapted for reclosure by means of the same, is provided.

Figure 23:
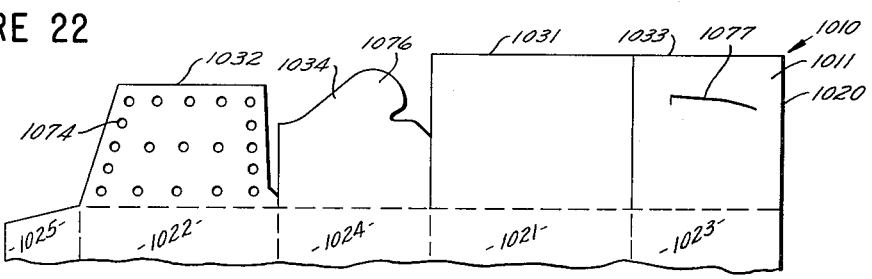

FIGURE 23 shows a carton blank 1020 formed of laminated sheet material 1010 having thinner or paper ply 1011 facing the viewer. Face and end panels and glue flap 1021 through 1025 are visible. Similarly, front top flap 1031, recessed back top flap 1032, and end flaps 1033 and 1034 are apparent. Right hand end flap 1034 is again provided with hook 1076 adapted to be inserted in eye 1077 of end flap 1033. Back top flap 1032 is provided with a series of circular punch-outs 1074 in spaced relation to its edges. Upon erecting, closing, and sealing of the carton in exactly the manner given for the carton blank of FIGURE 22, an adequately tacked carton adapted for reclosure by means of hook 1076 and eye 1077 is provided.

Figure 24:
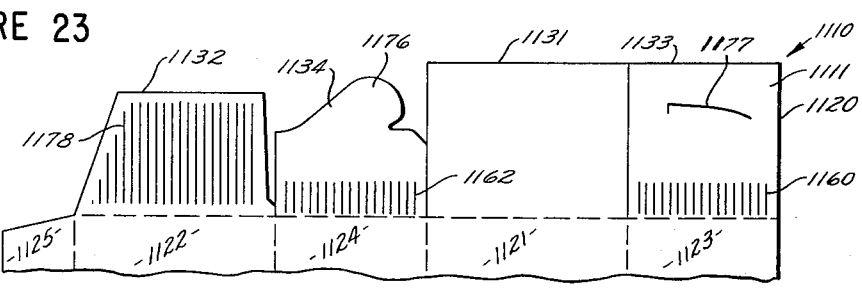

FIGURE 24 shows carton blank 1120 formed front laminated sheet material 1110 with thinner or paper ply 1111 facing the viewer. Face and end panels and glue flap 1121 through 1125 are apparent. Front top flap 1131, back top flap 1132, and end flaps 1133 and 1134 are also shown. End flap 1134 is provided with hook 1176 and end flap 1133 is provided with eye 1177. Back top flap 1132 is again partially cut away at its outer and lateral edges. The end flaps 1133 and 1134 and back top flap 1132 are respectively provided with slits 1160, 1162 and 1178, these slits being in thinner or paper ply 1111 and in end flaps 1133 and 1134 being located adjacent the score lines along which these end flaps adjoin their respective end panels. Upon erecting the carton, folding the flaps, and sealing as given for the carton blank of FIGURE 22, a more adequately sealed carton but again adapted for reclosure by means of the hook 1176 and eye 1177 is provided. The cuts may also be in the outer or upper ply of flap 1131 instead of or in addition to those in the inner ply of flap 1132.

Figure 25:
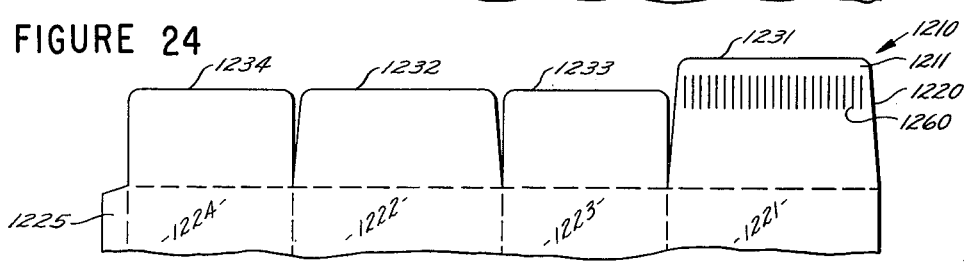

FIGURE 25 shows carton blank 1220 of laminated sheet material 1210 with thinner or paper ply 1211 facing the viewer. Face and end panels and glue flaps 1221 through 1225 are all apparent. Back top flap 1232 and end flaps 1233 and 1234 are of conventional type and are all of approximately equivalent lateral reach and have rounded corners. Front top flap 1231 is of somewhat greater lateral reach than the other flaps, is generally of the dimensions of an end cross-section of the carton to be erected, and is provided with a series of longitudinally arranged vertical cuts 1260 in its thinner or paper ply 1211 near its longitudinal edge. Upon erecting the carton, folding end flaps 1233 and 1234 in, back top flap 1232 in upon the two end flaps, and front top flap 1231 upon the back top flap, and then applying heat or heat and pressure in the vicinity of the cuts 1260 but at the outer exposed surface of front top flap 1231, an adequately tacked and tamper-proof carton is provided. In this embodiment, the cuts may be in back top flap 1232 adjacent the score line along which it joins its face panel 1222 in addition to or instead of the slits in flap 1231.

Figure 26:
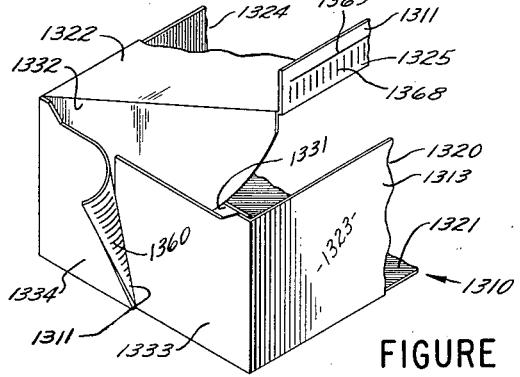
FIGURE 26 is a broken isometric view of a carton embodying the invention erected from a carton blank embodying the invention showing the heat-sealing areas thereof exposed to view.

The isometric view of FIGURE 26 shows a carton blank 1320 of laminated sheet material 1310 with thicker or paperboard ply 1313 forming the exterior of an end or front opening trunk-style carton erected therefrom and with thinner or paper ply 1311 disposed interiorly of the carton. In this view, the heat-sealing areas are shown exposed to view. The carton blank from which the carton of FIGURE 26 is erected comprises a bottom face panel 1321, top face panel 1322, front panel 1323 and back face panel 1324. End flap 1333 is attached to front face panel 1323, end flap 1334 is attached to back face panel 1324, inner end flap 1331 is attached to bottom face panel 1321, and rounded end flap 1332 is attached to top face panel 1322, all along the longitudinal score line of the starting carton blank 1320. A series of cuts 1360 is provided in the inner or paper ply 1311 of end flap 1334. Likewise, a series of cuts 1368 and 1369 are provided in the thinner or paper ply 1311 of flap 1325, which is articulated to top face panel 1322. As viewed with flap 1325 upright, slits 1368 are vertical and slit 1369 is horizontal or longitudinal of flap 1325. In erecting the carton of FIGURE 26, upon folding inner side flap 1331 into a vertical position with respect to its adjoining bottom face panel 1321, folding rounded end flap 1332 into a vertical position with respect to its adjoining top face panel 1322, folding end flap 1333 upon inside end flap 1331 and end flap 1334 upon end flap 1333, and then inserting the rounded end flap 1332 into the pocket formed by end flaps 1331, 1333 and 1334, which latter two flaps constitute the outer end of the carton, an end or front opening trunk-style carton having the structure shown in FIGURE 26 is provided. Upon the application of heat or heat and pressure to the vertical edge of end flap 134, an efficient seal between end flap 1334 and end flap 1333 is provided in the area of cuts 1360. Likewise, upon the folding of flap 1325 downwardly upon the outer surface of front face panel 1323 and the application of heat or heat and pressure to the outer surface 1313 of the said flap 1325, an effective seal is provided between flap 1325 and front face panel 1323 in the area of cuts 1368 and 1369. Upon opening of the carton by the rupture of the seal in the area of cuts 1368 and 1369 of flap 1325, access to the contents is provided, but the carton is effectively reclosable due to the frictional contact maintained by rounded end flap 1332 in the pocket provided by inner end flap 1331 and the outer end flaps 1333 and 1334. In this embodiment, slits may be present in outer ply 1313 of end flap 1333 along its vertical edge in addition to or instead of those in flap 1334, and may be present in outer ply 1313 of front face panel 1323 in addition to or instead of those in front flap 1325.

It will be noted that FIGURES 21 through 26 relate to tack- or tamper-proof type sealing carton blanks and cartons, as opposed to hermetically or leak-proof sealing type of carton.

It will also be noted that FIGURES 8, 9, 10, 11, 20, 21 and 23 related to carton blanks and cartons of laminated sheet material having perforations, punch-outs, or cut-outs in a flap adapted to be an underlying flap upon erection of the carton and folding of the flaps upon each other to provide a closure of the carton. It is moreover to be noted that a recessed, relieved, or cut-away underlying flap may be provided as indicated in FIGURES 8 through 11 and 23, especially 8 and 9.

It is further desired to point out that FIGURES 2, 3, 5, 6, 7, 12, 13, 14, 15, 16, 17, 18, 19, 22, 24, 25 and 26 show carton blanks and cartons having slits or cuts disposed in one ply only of one or more closure flaps.

It is moreover desired to point out that FIGURES 13 and 14 show slits, through a single ply of the laminated sheet material of a carton blank and carton, disposed on the flap employed for closing of the side seam of the carton, previously ordinarily referred to in the art as the "glue flap."

It is also desired to point out that FIGURE 26 shows a carton having a side seam sealed by cuts, in a single ply of the laminated sheet material at an area of overlap of two side or end wall flaps, which upon application of heat or heat and pressure provides an adequate seal between the two side or end flaps in the area of overlap provided with said slits or cuts into the layer of thermoplastic laminant.

It is moreover desired to point out that FIGURE 26 also shows a front top closure flap attached to a hinged-cover carton provided on its inner surface with slits or cuts through the outer ply and into the layer of thermoplastic adhesive laminant for bonding the front top closure flap to the outer surface of the front face panel upon the application of heat or heat and pressure to the exterior surface of said front closure flap.

It is also desired to point out that the carton blanks and cartons of FIGURES 2, 3, 5, 6, 7, 17, 18, 19 and 24 are provided with a flap, which is designed to be the intermediate flap upon closure of the carton, having recessed, relieved, or cut-away edges, which said relieved edges cooperate with the slits or cuts in the upper ply of the inner flap or the inner ply of the outer flap, or both, to provide an unprecedented seal of said carton, especially in the area of overhang of said recessed flap by said top flap, or with perforations, cut-outs, or punch-outs in said relieved flap to provide an unprecedented bonding of the inner flaps directly to said outer flap due to rivets of adhesive wherever such perforations or the like are provided. It is apparent that in some embodiments the slits or cuts shown in the inner ply of the outer flap or the outer ply of the inner flap, or both, will preferably not be present in the area of overhang of the relieved intermediate flap by said outer flap, but only in the area in which surfaces of the intermediate and outer flaps are opposed.

It is moreover pointed out that FIGURES 2, 3 and 5 illustrate carton blanks and cartons having slits in the plies which will be the inner ply of the outer flap and the inner ply of an intermediate flap upon closing the carton; that FIGURES 6 and 7 illustrate carton blanks and cartons having slits in the ply which will be the inner ply of the outer flap upon closing of the carton and which can equally well be located in the upper ply of the intermediate flap upon closure of the carton; that FIGURES 12, 13 and 14 illustrate carton blanks and cartons having slits or cuts in the inner ply of the outer flap and the upper ply of the intermediate flap upon closure of the carton; that FIGURES 15 and 16 illustrate carton blanks and cartons having slits or cuts in the upper ply of the inner flaps and in the upper ply of the intermediate flap upon closure of the carton, which combination can also include slits or cuts in the inner ply of the outer flap upon carton closure, or which can equally well be replaced by slits or cuts in the upper ply of the inner flaps and in the inner ply of the outer flap upon closure of the carton; that FIGURES 17, 18 and 19 illustrate carton blanks and cartons having slits or cuts in the upper ply of the intermediate flap and in the inner ply of the outer flap upon closure of the carton; that FIGURE 22 illustrates carton blanks and cartons having slits or cuts in the outer hook and eye end flaps adjacent the score line along which they are joined to their respective face panels; FIGURE 24 shows the same thing except that, in addition to the slits or cuts provided in the outer male and female lock flaps, slits or cuts also provided in the inner ply of the intermediate flap and could also equally well be provided instead in the upper ply of the inner flap or in both the upper ply of the inner flap and the lower ply of the intermediate flap; and that in FIGURE 25 slits or cuts are provided in the inner ply of the outer flap in the area adjacent its longitudinal edge.

In operation, a carton blank is produced from suitable laminated stock, such as the laminated sheet material shown in FIGURE 1, the blank having a configuration the same as or similar to those shown in the drawings. The selected base sheets or plies are first laminated together with sufficient thermoplastic adhesive laminant according to conventional procedure, as with metering rods, squeeze-roll laminators, and reverse roll laminators, and the requisite ply openings provided in the heat-sealing areas of the carton blank at any one or more of several stages of its construction from the selected laminated sheet materials. The exact order of steps whereby the blank is constructed is of minor significance, except that the desired openings be provided after the lamination as indicated previously. The selected base sheets may be laminated with the requisite quantity of selected thermoplastic adhesive laminant, the laminated sheets printed as desired or otherwise provided with any necessary artwork, the requisite openings in the already-determined heat-sealing areas preferably provided at this stage, and the sheet then scored and die cut in one or several separate operations to the desired dimensions. Scoring, die cutting, and provision of the openings may also be done simultaneously. Alternatively, the order may be: lamination, printing, scoring and die cutting, and provision of requisite openings in the heat-sealing areas; or, printing of the base sheet materials, lamination, provision of the openings in the heat-sealing areas, and scoring and die cutting. The order may also be: printing of the base sheet materials, lamination, scoring and die cutting, and provision of the openings in the heat-sealing areas. At any rate, the openings of the heat-sealing areas will in all cases be indexed, aligned, or oriented with respect to flaps or other carton members having need to be sealed or secured and may also be oriented with respect to the desired printing or artwork, and will be located in one or more plies of the carton members which are to be heat- sealed. Any driving force as further mentioned herein will ordinarily be provided at some point, such as during rotogravure or other printing of the sheet materials, but at any rate at some stage during the carton blank formation stage if not already coated upon or in a base sheet material. The quantity, type, and disposition of the openings in the heat sealing areas, as well as the heat-sealing areas themselves, will vary depending upon the application of the carton and the intended manner of employing the heat-sealing closure thereof. For a tacked or tamper-proof closure, the heat-sealing area will ordinarily be of smaller area than when a hermetic seal is desired, e.g., involving a series of interstices along one flap edge rather than generally or even substantially throughout an entire flap area, and will ordinarily involve only one or a few closure flaps rather than most or all of them which are usually involved in providing a hermetically sealed carton closure. The heat-sealing areas and the openings provided in the plies of the carton closure members in these heat-sealing areas will be as more fully illustrated by the drawings and as described elsewhere in this specification. When a front flap or a side-seam closure flap or a side-seam overlap closure flap, or the like, are involved, the openings may be provided either in the ply of the flap itself or in the ply of the flap or carton face to which it will be adhesively secured, or both, just as in providing heat sealing areas in the more usual carton end closures the openings may be either in one or both of the opposed plies of the laminated sheet material constituting the flap surfaces.

After provision of the carton blank with suitably disposed heat-sealing areas, a carton body is erected from the formed carton blank by seaming in the usual manner by securing two face panels thereof by means of a side-sealing flap, as by folding the carton blank along one score line about one hundred eighty degrees so as to place the side-sealing flap in a horizontal position facing upwardly, folding the carton blank along another score line so as to bring the inside of the face panel which is to be adhered to the side-sealing flap into overlying relation with respect to said side-sealing flap, and then securing the flap and panel to each other, a folded carton body or tube being thus produced. Glue or other adhesive is conventionally used for securing such members and is usually satisfactory. Application of adhesive-activating conditions to the glued or otherwise secured side seam either at this point or just prior to adhering the flap to the panel, which usually involves application of a certain amount of pressure, extrudes thermoplastic adhesive from the cut edge of the side-sealing flap, which upon setting of the adhesive is thus sealed against wicking. Since, according to the invention, either or both of the upper surface of the side-sealing flap and the inner surface of the panel in the area to be adhered to said flap is provided with openings into the layer of intercalated thermoplastic adhesive laminant in their area of overlap (see FIGURES 13 and 14), the seaming may be effected in the manner given with application of heat or heat and pressure to this heat-sealing area, which frequently extends substantially the full length of the side seam of the carton, resulting in extrusion of the thermoplastic laminant adhesive through the said openings and the cut edges and provision of an effective seal between the inside of the face panel and the outer surface of the side-seam sealing flap in the said area of their overlap or juxtaposition.

The same method of operation, but after carton erection, is employed when a front flap is to be adhered to a front face panel, such as in the carton shown in FIGURE 26, except that in such case the heat-sealing areas and openings into the intercalated thermoplastic adhesive layer are provided in the outer surface of the front face panel or in the inner surface of the front flap, or both, and the application of heat or heat and pressure or other adhesive-activating conditions in the area of overlap of the said flap and face panel produces an effective seal therebetween due to extrusion of thermoplastic adhesive laminant from the intercalated laminant layer through the openings provided in said flap and/or panel ply.

After seaming the carton by securing two face panels by means of the side-sealing flap, whether the conventional glue type or having a heat sealing area according to the invention, the folded carton may be shipped flat and/or unfolded ninety degrees to form a tube. The carton may then be closed by folding in the inner flap or flaps, folding the intermediate flap upon the inner flap or flaps, and folding the top or outer flap upon the intermediate flap, all of said flaps usually being articulated to carton face panels. Filling of the carton is usually effected after closure of one end thereof, but may be effected after both ends of the carton are closed in the case of trunk-style or front-opening carton constructions (see FIGURE 26). The application of heat or heat and pressure to the heat sealing areas after carton closure produces an effective seal due to extrusion of the thermoplastic adhesive laminant from the openings in the plies of the various flaps or other heat sealing areas of the carton construction and by extrusion from cut edges. The glue flap at the side seam, if not previously heated, can be heated for edge-sealing purposes after carton erection or closure and even after filling of the carton, just as well as at an earlier stage.

Adhesive-activating conditions may also be provided in selected cases by infra-red rays, dielectric heating, or application of electronic means such as microwaves, and in some cases, as already indicated for the glue flap, especially where pressure will be employed in sealing, the adhesive-activating conditions may be applied momentarily just before closing all or even any of the closure flaps rather than after. It is apparent that the adhesive-activating conditions must be applied in the vicinity of the heat-sealing area desired to be heat-sealed and to the flap or other carton member provided with the openings through which the thermoplastic laminant adhesive is desired to extrude, and that these adhesive-activating conditions will preferably be applied to the exterior of the carton after closing, usually most conveniently to the outer flap of the closed carton, or in any event to the exterior of the carton adjacent the area in which the heat sealing is desired to be effected. The application of adhesive-activating conditions is followed by adhesive setting conditions, which will ordinarily involve cooling or otherwise allowing the thermoplastic adhesive laminant to congeal, preferably under pressure contact, to prevent the flaps from springing apart until the adhesive has set or solidified, or has at least considerably increased in tack or viscosity. Upon setting of the adhesive, an effective seal is provided in the particular heat-sealing area in question in the manner fully indicated by the drawings, involving a seal of the one carton member to the other in the area of their opposed facing relationship by means of bodies of solidified thermoplastic laminant adhesive extending from the intercalated laminant layer of at least the one carton member through the openings provided in the ply of that member to at least the surface of the other carton member.

When the intermediate flap of the carton closure is recessed along an edge thereof so as to be narrower, usually in breadth, than the outer flap along at least a portion of an edge thereof, and so as to provide an area of overhang of said intermediate flap by said outer flap when said flaps are folded upon each other in closing of the carton, at least one and usually at least two inner flaps will provide a surface for opposed facing relation with said outer flap at a point where said intermediate flap is narrower than said outer flap. The outer flap will usually but not necessarily be dimensioned generally to cover the entire end cross-section of the carton body, and the intermediate flap will also usually but not necessarily be dimensioned generally to cover the entire end cross section of the carton body, but in any event will have edge portions where the same would ordinarily be exposed in the closed carton slightly recessed so as to extend inwardly of the corresponding edges of the outer flap. One or more recesses or areas of overhang in said closure will thus be formed and adapted to be filled with adhesive, and the application of adhesive-activating conditions to the said intermediate flap will cause the thermoplastic adhesive laminant carried between the plies of the intermediate flap to extrude outwardly of the recessed edge thereof to later congeal and thereby effect a seal between the surface of the outer flap and the surface of the inner flap, in said areas of overhang, by means of said extruded thermoplastic adhesive laminant, thereby also sealing off the cut edge of the said intermediate flap without however disposing any or substantially any of the thermoplastic laminant adhesive upon the exterior exposed faces of the carton.

A basic seal or tack between the surfaces of the carton flaps or other members, such as between the intermediate flap whether recessed or not and the outer flap, where convenient, may in some cases be effected by the employment of conventional glue or other adhesive, leaving the sealing between the outer flap and the intermediate flap, the inner flap or flaps and the intermediate flap, and between the outer flap and the inner flap or flaps in the area of overhang where such exists to be effected by the application of heat or heat and pressure or other adhesive-activating conditions. Thus, in one manner of operation, one end of the carton may be tacked with glue or other adhesive of conventional nature, the carton may be filled, the other end of the carton closed, and the ends of the carton sealed by the application of heat or heat and pressure or other adhesive-activating conditions thereto, either individually but preferably at both ends simultaneously, and the thermoplastic laminant adhesive thereby extruded through interstices and cut edges allowed to congeal. The same procedure of tacking with glue or other adhesive and thereafter extruding thermoplastic adhesive laminant through ply interstices and/or cut edges to form the seal may be applied to side-seam sealing flaps, front top flaps, side-seam overlaps, and the like, with or without filling of the carton after tacking but before sealing by extrusion and setting.

When sealing a carton provided with a recessed intermediate flap, the thickness of the sealing adhesive provided in situ in the recess between the outer flap and the inner flap or flaps, by extrusion from the recessed edge of the intermediate flap in combination with any openings from the outer flap or inner flap or flaps into the area of overhang, provides increased strength and resistance to handling, scuffing, and moisture-vapor transfer, and this thickness of adhesive in the said recess ordinarily fills the entire space separating the outer flap from the inner flap or flaps and is usually of a thickness approximately equivalent to that of the intermediate flap. Upon sealing by extrusion of thermoplastic adhesive from the recessed edges of an intermediate flap, especially when heat and pressure are employed, the thickness of the intermediate flap is frequently somewhat reduced and the extruded adhesive in the recessed area thus readily attains a thickness approximating that of the somewhat flattened intermediate flap. In addition, the inner flap may be and in some cases preferably is somewhat shortened so as to correspond upon folding with the contour of the recessed edge of the intermediate flap, or substantially so, or it may even be embossed or suitably contoured so as to provide a recess or seat for the relieved edge of the intermediate flap where said inner flap underlies the said intermediate flap, whereby the opposed surfaces of the inner and outer flaps are brought closer together.

While in the drawings it is indicated that thermoplastic laminant adhesive also extrudes out of the cut edges of the innermost flaps of the carton construction and while such does ordinarily occur when sealing the cartons against a mandrel or under considerable heat and/or pressure, it is to be understood that extrusion of the adhesive from the cut edges of the innermost flaps, while preferable in some instances, is optional and not a requisite for satisfactory sealing of the cartons. Moreover, where the drawings show carton blanks having a recessed intermediate flap attached to the back face panel of the carton, the recessed intermediate flap can equally well be attached to the front face panel of the carton and the outer flap, usually having dimensions generally approximating those of the carton end cross section, can equally well be attached to the back face panel. Further, the recessed intermediate flap at one end of the carton may be attached to the front face panel while at the other end of the carton the recessed intermediate flap may be attached to the back face panel, and vice versa. In addition, the relieving, recessing, or cutting back of the edges of the intermediate flap is not restricted to any particular geometric design or form of the intermediate flap or recess, and in one embodiment, for example, the intermediate flap may simply be tapered from its juncture with its adjoining face panel to a somewhat reduced width at its outer edge.

The following examples are given to illustrate some of the advantages of my method of forming carton blanks and heat-sealing cartons, as well as advantages of the carton blanks and cartons themselves, but are not to be construed as limiting.

*Example 1*

Clay-coated Fourdrinier paperboard .012 inch thick (guaranteed minimum 1500+ seconds porosity) was laminated to a fifty pound dry waxed sulfite sheet .0035 inch thick (14 seconds porosity) using .006 inch of laminating adhesive consisting of 3.6 percent butyl rubber and 96.4 percent microcrystalline wax of Mid-Continent origin melting at 155–165° F. (Bareco-Ceratak). The laminated sheet was scored and die cut by ordinary means on a job press, with the .012 inch coated board on the outside, coated side out. Slits were then cut in the inner ply deep enough to penetrate the inner ply (dry waxed sheet) but insufficient in depth to completely penetrate the laminating adhesive. The blank was substantially as shown in FIGURES 2 and 3. The side seam of the carton blank was glued with a polyvinyl acetate adhesive according to standard practice and a carton erected therefrom.

Folding cartons thus formed were placed over a mandrel the size of the inside of the carton, and the bottoms sealed with a hot iron at 450° Fahrenheit for 2, 3, 4, 5, and 6 seconds, then cooled while under pressure for 4, 6, 8, 10 and 12 seconds respectively while being contacted by a cool steel block. When tested by filling with water, none of the cartons leaked.

While filled two-thirds full of water, the tops of the cartons were heat-sealed under the foregoing conditions of heating and cooling, obviously without the use of a mandrel, and these too were found leakproof.

The cartons were then frozen for five days and thawed for one day, and were still found to be leakproof.

In a like manner, the above-described cartons were heated at their side seams to extrude laminant to the inside of the carton, their bottom flaps closed, the carton filled, top flaps closed, and the cartons heat sealed. The cartons were tested when filled with brown sugar, hygroscopic gelatin dessert powder, cake flour, powdered milk, frozen strawberries in syrup, and sugared cereal. After five months of storage, alternately between 90 percent relative humidity at 100° F. and 50 percent relative humidity at 73° F., these foodstuffs were in good condition. The frozen strawberries were stored at −10° F.

*Example 2*

A clay-pigment coated 59 pound per ream book paper .0035 inch thick (3000+ seconds porosity) was laminated to a fifty pound per ream dry waxed paper .0035 inch thick (14 seconds porosity) with wax laminant composed of 85 percent microcrystalline wax (Bareco-Ceratak), 1.66% hydrogenated tallow amides containing 22% hexadecanamide, 75% octadecanamide, and 3% octadecenamide (Armid HT) and 13.33 percent powdered attapulgite having a particle size between about two and about .02 microns with an average particle size of about .14 micron, containing seventeen percent moisture (Attagel 20). The laminating composition was applied in thicknesses of .0013, .0023, .003, .004, .0046 and .007 inch. Carton blanks of the design shown in FIGURES 2 and 3 were cut from the laminated stocks, glued with moisture-proof adhesive, cartons erected therefrom, and tested for heat sealability and leakproofness to water. Cartons from stocks having less than .004 inch of wax in the laminant layer failed to heat seal properly, while those with greater than this amount of wax sealed well and were leakproof when tested with water. The laminant used in this experiment had a density of fifteen ream pounds (24 x 36 x 500) per .001 inch thickness.

*Example 3*

A number of fibrous sheet materials were combined with several laminating agents, specimens the size of carton flaps were cut from the laminated sheets, then the inside sheets were slit over an area of one square inch using parallel slits, providing interstices extending into the laminant ply, and the thus-treated sheets tested for heat-sealability in a face-to-back (thinner ply to thicker ply) relationship (as shown in FIGURES 2, 3, 5, 6 and 7) with the following results:

| | Outside sheet | Inside (slit) sheet | Laminating agent and (thickness) | Heat-sealability |
|---|---|---|---|---|
| A | 50 lb. dry waxed (.0035″)[1] | 50 lb. dry waxed (.0035″)[1] | 3.6% butyl rubber / 96.4% Ceratak wax (.006″) | Good. |
| B | 59 lb. coated book (.0035″)[1] | do.[1] | 3.6% butyl rubber / 96.4% Ceratak wax (.006″) | Excellent. |
| C | do.[1] | 23 lb. TiO₂-filled sulphite (.002″) [13 seconds porosity]. | 3.6% butyl rubber / 96.4% Ceratak wax (.006″) | Do. |
| D | .012″ clay-coated paperboard [1] | 50 lb. dry waxed (.0035″)[1] | 3.6% butyl rubber / 96.4% Ceratak wax (.006″) | Do. |
| E | .014″ solid news paperboard [300+ seconds porosity guaranteed minimum]. | do.[1] | Attagel-Armid HT-Ceratak wax composition (of Example 2) (.0065″). | Do. |
| F | .012″ clay-coated paperboard.[1] | do.[1] | Wax-silica (microcrystalline wax bodied with colloidal silica) (.0065″). | Good. |

[1] Same as in previous examples.

It is clear that it is entirely unnecessary that the inside sheet be a porous sheet, or even more porous than the outside sheet, as evidenced by the following example.

*Example 4*

A 27 pound per ream vegetable parchment paper (1500+ seconds porosity) was laminated to a .012 inch clay-coated paperboard (same as in Example 1) with .007 inch of laminating agent composed of 1.5 percent of hydrogenated tallow amides (Armid HT), 1.5 percent titanium dioxide (TiO$_2$), eighty-four percent Pennsylvania grade microcrystalline wax, M.P. 150–160° Fahrenheit (Quaker State L–500), and thirteen percent of powdered attapulgite (Attagel 20), and mixed to a viscous thixotropic state under high shear. The laminated sheet was scored, die cut, and the parchment surface slit as shown in FIGURE 3. When heat sealed at the glue seam and both ends, the cartons erected from the thus-produced blanks were found suitable for the packaging of greasy foods such as process cheese, natural cheese, oleomargarine, butter, chop suey, cottage cheese, and shortening with no sign of leakage or staining after three months storage.

As noted in Example 4, it is sometimes advantageous to apply heat to the glue seams to provide an extrusion of laminating composition in these zones. If it is desired to form heat sealed glue lines, slits may be provided along the surfaces of the inside sheet where it will overlap the outside sheet (see FIGURES 13 and 14), or in the outside sheet, or in both sheets. In other cases it is satisfactory to glue the carton in the regular manner, then apply heat at the juxtaposition of the raw edges of the side seam to extrude adhesive over any exposed raw edges. With dry products in the package, it is frequently unnecessary to apply heat at overlapping glue lines, as at the carton side seam.

In addition to seals in a face-to-back relationship (as in FIGURES 2, 3, 5, 6 and 7), I find that in some applications, such as in prescored bacon sleeves, cheese packages, milk bottles, and the like, it is advantageous to seal inside surfaces to inside surfaces. In this case, excellent seals are obtained whether one or both of the contiguous surfaces are slit for extrusion of the adhesive.

In some applications it is not desirable to extrude adhesive at the cut edges, in which case the openings, e.g., slits, may be at some distance, for example one quarter of an inch, away from such cut edges, and heat applied only at these positions (see FIGURES 22–25).

I have moreover found that it is possible to completely perforate portions of the sheet material, especially those portions forming inner and intermediate flaps of a folding carton. In these cases it is possible to cause the adhesive to flow to either or both sides of such flaps to form a satisfactory bond to contiguous flap or other surfaces. Top flap constructions of such heat sealing carton blanks and cartons are shown in FIGURES 8, 9, 10, 11, 20, 21 and 23.

*Example 5*

Carton blanks as shown in FIGURE 8 were cut from a stock composed of 59 pound coated book paper .0035 inch thick laminated to a fifty pound dry waxed sulphite .0035 inch thick with ninety pounds per ream of a wax composition composed of thirteen percent attapulgite powder (Attagel 20), 1.5% of hydrogenated tallow amides (Armid HT), 1.5% titanium dioxide (TiO$_2$), and 84 percent laminating grade microcrystalline wax. The flaps were perforated in the same operation in which the blanks were scored and cut on a platen press. When formed into cartons and heat sealed at 400° Fahrenheit for one second, these cartons adequately protected powdered skim milk, cereal, dehydrated potatoes, and hygroscopic dessert powder for extended periods under varying climatic conditions.

The process of heat sealing cartons of the invention by extrusion of adhesive from the interstices provided in one or more plies of carton members with or without additional extrusion from recessed edges of an intermediate flap is not only advantageous because of its ready adaptability to both leakproof and non-leakproof seals, and the high quality of such seals, but is moreover particularly advantageous in that for most purposes it obviates the use of a mandrel for sealing. The number of cartons which can thus be heat sealed in a given time is greatly increased over that previously attainable in view of the fact that the maximum number of cartons which can be sealed per minute using a mandrel is about ninety, while on present day packaging machinery without the necessity of employing a mandrel the number of cartons which can be sealed per minute is on the order of four hundred.

In accord with the foregoing disclosure, an especially suitable liquid-proof closure for containers especially adaptable to the storage or transportation of liquids is formed in the manner of the invention by providing the carton body with the usual two inner flaps, an intermediate flap, and an outer flap, said outer flap having generally the dimensions of an end cross-section of the carton body, which cross-section is ordinarily rectangular, e.g., square. The intermediate flap is usually cut-away or recessed at its edges in the manner hereinbefore disclosed, so as to be narrower with respect to the outer flap, although usually of the same width as its adjoining face panel at its juncture therewith. The inner flaps are provided with openings in the ply thereof which is outwardly disposed upon closing of the carton, and said outer flap has openings in the ply thereof which will be inwardly disposed upon closing of the carton. Openings in the ply of the inner flap which will be outwardly disposed and/or in the ply of the outer flap which will be inwardly disposed upon closing of the carton are preferably provided in the area of overhang of said intermediate flap by said top flap when said intermediate flap is recessed at its edges. The said intermediate flap is provided with openings in both of the base plies thereof, and is preferably perforated from surface to surface thereof without removal of sheet material or by punching so as to remove a portion of the sheet material of construction of said intermediate flap within localized areas. Cartons constructed in such manner, upon closing of the flaps and sealing, which is in such case usually effected against a mandrel, have been found to be extremely leakproof and liquid-proof, and for example have special application as milk cartons and the like. For such type and other liquid-proof cartons, as will be apparent from the previous disclosure, a dry waxed sheet is preferred as the inner ply of the laminated sheet material of the carton construction, and such a dry-waxed sheet having a weight of about twenty to thirty, e.g., 27 pounds, per ream prior to waxing is especially suitable. The outside ply of such sheet material to give a carton especially suitable as a liquid-proof container will ordinarily be paperboard having a caliper ranging from about .01 to about .018 inch.

Especially suitable cartons useful because they need not be sealed against a mandrel are those wherein openings are provided in the inner ply of the outer flap with or without additional openings in the inner ply of the intermediate flap, and especially where such outer plies are pigment or clay-coated or coated with a combination of such materials, in which case the driving force provided upon application of thermoplastic adhesive laminant activating conditions to the carton exterior effectively drives the adhesive from the intercalated laminant layer of the outer flap, and of the inner flap when provided with openings in its inner ply, through the openings provided in such flaps thereby to effect an efficient seal with underlying flaps without the use of a mandrel, and the provision of such carton blanks and cartons having such openings in the inner ply of the outer flap with or without additional openings in the inner ply of the intermediate flap and with or without, but preferably with, recessing of the edges of the intermediate flap, therefore constitutes a preferred embodiment of the invention.

It is thus seen that the present invention provides novel carton blanks and cartons, and a novel method of forming such blanks and cartons, especially sealed cartons, whereby all of the objectives of the invention are accomplished and whereby the packaging industry is provided with a new approach to carton packaging, due to elimination of many of the problems and shortcomings which have beset producers and users of heat sealing cartons in the past.

It is to be understood that the invention is not limited to the exact details of construction, operation or exact materials shown and described, as obvious modifications and equivalents will be apparent to one skilled in the art, and the invention is therefore to be limited only by the scope of the appended claims.

I claim:

1. A scored carton blank of laminated sheet material having an overall thickness of at least .008 inch suitable for fabrication into a sealed carton, the base plies of which laminated sheet material comprise at least two sheets which are individually at least .002 inch thick and have a porosity of at least five seconds, and in which the laminant is a thermoplastic adhesive laminant present in an amount of at least about fifty-five pounds of laminant per ream of laminated sheet material, said carton blank comprising a plurality of carton members, including panels and flaps articulated to said panels along score lines, at least some of said carton members being adapted to be folded upon each other to provide a plural layered closure in which one carton member lies in juxtaposition to another carton member so as to place a surface of the one carton member in opposed facing relation to the surface of the other carton member and thereby provide an area in which a seal between said members can be effected, at least one of said carton members being provided, in a ply thereof constituting a surface thereof which will come into opposed facing relationship with the surface of the other carton member in the said sealing area upon folding of the carton blank in erecting a carton therefrom and closing of the same, with openings from said surface thereof to the intercalated laminant layer thereof, said thermoplastic laminant adhesive in said carton member provided with openings being adapted to extrude through said openings in said ply to at least the surface of the member in opposed facing relation therewith, and thereby to effectively seal said one carton member to said other carton member in the area of their opposed facing relationship, upon folding said carton blank so as to bring the surface of the ply of the carton member provided with said openings into opposed facing relationship with the surface of the other carton member in said sealing area, applying thermoplastic laminant adhesive-activating conditions to the carton member provided with said openings to cause extrusion of thermoplastic adhesive laminant from the intercalated laminant layer thereof through said openings, and setting said thus-extruded laminant.

2. A carton blank according to claim 1, wherein the base plies of the laminated sheet material have a porosity of at least ten seconds and a Mullen dry burst strength of at least ten pounds, and wherein the laminant adhesive thickness is at least about .004 inch.

3. A carton blank according to claim 1, wherein openings into the intercalated laminant layer are provided in at least one of the plies constituting the surface of a side-seaming flap and the surface of a face panel which will come into juxtaposition therewith in formation of a carton side seam.

4. A folding carton made by seaming a carton blank of claim 3 by the application of heat.

5. A carton blank of claim 1, wherein one of the base sheet materials of the laminated sheet material carries a driving force-providing material to assist with the extrusion of the thermoplastic adhesive laminant in the form of a material which develops vapor pressure when subjected to thermoplastic adhesive activating conditions, said material comprising a solid.

6. A carton blank of claim 1, wherein the laminated sheet material comprises at least one material selected from the group consisting of paper and paperboard and wherein the openings are provided in the form of slits in a ply of the laminated sheet material which will be unexposed upon closing of a carton erected from said blank.

7. A carton blank of claim 1, wherein the laminated sheet material comprises at least one material selected from the group consisting of paper and paperboard and wherein openings in the carton member are provided in an underlying member in the form of perforations through the entire thickness of the member.

8. A carton blank according to claim 1, including a carton top face panel and front face panel, a front top flap articulated with said top face panel and adapted to be folded over upon the front face panel upon folding of the flaps in closing of a carton erected from said blank, and openings into the intercalated thermoplastic adhesive laminant layer in at least one of the plies constituting the surface of said front top flap and the surface of said front face panel which will come into juxtaposition therewith upon folding of the flaps in closing of the carton formed from said blank.

9. A carton blank according to claim 1, including carton top, bottom, front and back face panels, an end flap articulated to said bottom face panel and adapted to be an inner end flap upon erection of a carton from said blank, outer flaps articulated to said front and back face panels and adapted to be folded over upon each other so as to provide at least some area of overlap and together to constitute a carton end upon folding of the flaps in erection of the carton, and an intermediate end flap articulated to said top face panel and adapted to be folded over and inserted into the slot provided between the inner end flap and the two outer end flaps constituting the carton end upon folding of the flaps in closing of the erected carton, and openings into the intercalated laminant adhesive layer of at least one of the said outer end flaps adapted to constitute the carton end in a ply thereof constituting one of the surfaces thereof which will come into juxtaposition upon folding of the flaps in erection of the carton.

10. A scored carton blank of laminated sheet material having an overall thickness of at least .008 inch, suitable for fabrication into a sealed carton, the base plies of which laminated sheet material comprise at least two sheets which are individually at least .002 inch thick and have a porosity of at least five seconds, and in which the laminant is a thermoplastic adhesive laminant present in an amount of at least about fifty-five pounds of laminant per ream of laminated sheet material, said blank having at least one series of closure flaps including an outer flap and an underlying flap, said flaps being articulated with face panels along score lines and adapted to be folded in sequence upon erecting a carton from said blank and closing of the same to provide a plural layered closure in which flaps lie with the surface of one flap upon the surface of another flap, at least one of said underlying and outer flaps being provided, in a ply thereof constituting a surface of said flaps which will come into opposed facing relationship therebetween upon folding of the flaps in closing of the carton, with openings from the surface thereof to the intercalated laminant layer thereof, said thermoplastic adhesive laminant in said flap provided with said openings being adapted to extrude through said openings in said ply to at least the surface of the flap in opposed facing relationship therewith and thereby provide an effective seal therewith, upon erection of a carton from said blank and closing and sealing thereof by the application of thermoplastic laminant adhesive-activating conditions to the flap provided with said openings and allowing the said extruded laminant to congeal.

11. A carton blank according to claim 10, wherein the openings are in the form of slits.

12. A carton blank according to claim 10, wherein the said openings are provided in the form of slits distributed throughout substantially all of the surface area of the flap with the exception of margins adjacent the flap edges and any score line along which it adjoins another carton member.

13. A carton blank according to claim 10, wherein said outer flap is provided with openings in the ply thereof which will be inwardly disposed upon folding of the flaps in closing of the carton and in a portion of a surface thereof which will come into opposed facing relation with the surface of said underlying flap upon folding of the flaps and closing of the carton, said openings being provided in a localized area adjacent the edge of said outer flap opposite its juncture with its face panel.

14. A carton blank according to claim 10, wherein the carton blank includes in its series of closure flaps outer male and female lock flaps, both of which are adapted to overlie said underlying flap upon closure of a carton erected from said blank, and wherein at least one of said male and female lock flaps is provided in the ply thereof which will be inwardly disposed upon folding of the flaps in closing of the carton with openings into the intercalated laminant adhesive layer thereof in an area thereof adjacent its adjoining face panel.

15. A carton black according to claim 10, wherein at least one inner flap is included in said series of closure flaps of said carton blank and adapted to be folded first in closing of a carton erected from said blank, and wherein openings are provided in the inner ply of the outer flap and in the inner ply of the underlying flap, as such plies will be disposed upon closing of a carton erected from said blank.

16. A carton blank according to claim 10, wherein at least one inner flap is included in said series of closure flaps of said carton blank and adapted to be folded first in closing of a carton erected from said blank, and wherein openings are provided in the outer ply of the underlying flap and are additionally provided in the outer ply of an inner flap, as such plies will be disposed upon closing of a carton erected from said blank.

17. A carton blank of claim 10, wherein one of the base sheet materials of the laminated sheet material is a fibrous sheet material which carries a driving force-providing material to assist with the extrusion of the thermoplastic adhesive laminant in the form of a solid material which develops vapor pressure when subjected to thermoplastic adhesive activating conditions, said driving force-providing material being coated upon the base sheet material of the laminated sheet material of the carton construction adapted to become the outer ply upon erection of a carton therefrom.

18. A carton blank of claim 17, wherein the driving force is provided by a member selected from the group consisting of mineral clays and pigments.

19. A scored carton blank of laminated sheet material having an overall thickness of at least .008 inch, suitable for fabrication into a sealed carton, the base plies of which laminated sheet material comprise at least two sheets which are individually at least .002 inch thick and have a porosity of at least five seconds, and in which the laminant is a thermoplastic adhesive laminant present in an amount of at least about fifty-five pounds of laminant per ream of laminated sheet material, said blank having at least one series of closure flaps including an end flap, an intermediate flap, and an outer flap, said flaps being articulated with face panels along score lines and adapted to be folded in sequence upon erecting a carton from said blank and closing of the same to provide a plural layered closure in which flaps lie with the surface of one flap upon the surface of another flap, said intermediate flap being recessed along an edge thereof so as to be narrower than said outer flap along at least a portion of an edge thereof and so as to provide an area of overhang of said intermediate flap by said outer flap when said flaps are folded upon each other upon closing of the carton, said end flap providing a surface for opposed facing relation with said outer flap in said area of overhang upon closing of the carton, at least one of said intermediate and outer flaps being provided, in a ply thereof constituting a surface of said flaps which will come into opposed facing relationship therebetween upon folding of the flaps in closing of the carton, with openings from the surface thereof to the intercalated thermoplastic adhesive laminant thereof, said thermoplastic adhesive laminant in said flap provided with said openings being adapted to extrude through said openings in said ply to at least the surface of the flap in opposed facing relationship therewith, and said thermoplastic adhesive in said intermediate flap being adapted to extrude through the recessed edge thereof into the area of overhang of said intermediate flap by said outer flap, thereby to provide an effective seal of said outer flap to said intermediate flap in the area of their opposed facing relationship and between said end flap and said outer flap in the area of their opposed facing relationship, upon erection of a carton from said blank and closing and sealing thereof by the application of thermoplastic laminant adhesive-activating conditions to the flap provided with said openings and to the said intermediate flap and allowing the said extruded laminant to congeal.

20. A carton blank of claim 19, wherein openings are also disposed in a ply of said end flap so as to be present in the area of opposed facing relationship of said outer flap by said end flap upon closing of the carton.

21. A carton blank according to claim 19, wherein openings are provided in the ply of the intermediate flap which will be the inner ply thereof upon folding of the flaps in closing of a carton erected from said blank, and wherein openings are also provided in the ply of the outer flap which will be the inner ply thereof upon folding of the flaps in closing of the carton erected from such blank.

22. A carton blank of claim 19, wherein openings are provided in the ply of said outer flap which will be inwardly disposed upon closing of a carton erected from said blank and said openings are disposed in said ply of said outer flap so as to be present in the area of overhang of said intermediate flap by said outer flap upon closing of the carton.

23. A carton blank according to claim 19, wherein openings are provided in the ply of the intermediate flap which will be the outer ply thereof upon folding of the flaps in closing of a carton erected from such blank, wherein openings are also provided in the ply of an end flap which will be the outer ply thereof upon folding of the flaps in closing of the carton, and wherein openings are disposed in said ply of said end flap so as to be present in the area of overhang of said intermediate flap by said outer flap upon closing of the carton erected from said blank.

24. A printed carton blank according to claim 19, wherein said printing and openings are aligned with said carton flaps, panels, and score lines.

25. A printed carton blank according to claim 10, wherein said printing and openings are aligned with said carton flaps, panels, and score lines.

26. A scored carton blank of laminated sheet material having an overall thickness of at least .008 inch suitable for fabrication into a sealed carton, the base plies of which laminated sheet material comprise at least two sheets which are individually at least .002 inch thick and have a porosity of at least five seconds, and in which the laminant is a thermoplastic adhesive laminant present in an amount of at least about fifty-five pounds of laminant per ream of laminated sheet material, said blank having at least one series of closure flaps including an outer flap, an intermediate flap, and an inner flap, said flaps being articulated with face panels along score lines and adapted to be folded in sequence upon erecting a carton from said blank and closing of the same to provide a plural layered closure in which flaps lie with the surface of one flap upon the surface of another flap, said intermediate flap being provided, in the outer plies thereof, with openings from both surfaces of said flap to the intercalated laminant adhesive layer thereof, said thermoplastic adhesive laminant in said intermedaite flap being adapted to extrude through said openings in said plies thereof to at least the surface of flaps in opposed facing relationship therewith, thereby to provide an effective seal of said outer flap with said inner flap through the openings provided in the plies of the intermediate flap upon erection of a carton from said blank and closing and sealing thereof by the application of thermoplastic laminant adhesive-activating conditions to the intermediate flap and allowing the said extruded laminant to congeal.

27. A carton blank of claim 26, wherein openings are provided in the form of perforations through the entire thickness of the intermediate flap.

28. A carton blank of claim 26, wherein openings are also provided in at least one of the plies of the outer and inner flaps which come into opposed facing relation with the surfaces of said intermediate flap upon closure of a carton erected from said blank.

29. A scored carton blank of laminated sheet material having an overall thickness of at least .008 inch suitable for fabrication into a sealed carton, the base plies of which laminated sheet material comprise at least two sheets which are individually at least .002 inch thick and have a porosity of at least five seconds, and in which the laminant is a thermoplastic adhesive laminant present in an amount of at least about fifty-five pounds of laminant per ream of laminated sheet material, said blank having at least one series of closure flaps including an inner flap, an intermediate flap, and an outer flap, said flaps being articulated with face panels along score lines and adapted to be folded in sequence upon erecting a carton from said blank and closing of the same to provide a plural layered closure in which flaps lie with the surface of one flap upon the surface of another flap, said intermediate flap being recessed along an edge thereof so as to be narrower than said outer flap along at least a portion of an edge thereof, and so as to provide an area of overhang of said intermediate flap by said outer flap when said flaps are folded upon each other upon closing of a carton erected from said blank, said inner flap providing a surface for opposed facing relation with said outer flap in said area of overhang upon closing of the carton, said intermediate flap being provided, in both outer plies of said flap, with openings from the surfaces thereof to the intercalated laminant adhesive layer thereof, said thermoplastic adhesive laminant in said intermediate flap being adapted to extrude through said openings in said plies thereof to at least the surfaces of the flaps in opposed facing relationship therewith and through the recessed edge thereof, thereby to provide an effective seal of said outer flap with said inner flap through the openings provided in the plies of the intermediate flap and to effectively seal said outer flap to said inner flap in the area of their opposed facing relationship in said area of overhang, upon erection of a carton from said blank and closing and sealing thereof by the application of thermoplastic laminant adhesive-activating conditions to the intermediate flap and allowing the said extruded laminant to congeal.

30. A carton blank of claim 29, wherein openings are also provided in at least one of the plies of the outer and inner flaps which come into opposed facing relation with the surfaces of said intermediate flap upon closure of a carton erected from said blank.

31. A carton blank of claim 30, wherein openings are present in at least one of said inner and outer flaps in said area of overhang of said intermediate flap by said outer flap.

32. An erected and sealed carton formed of laminated sheet material having an overall thickness of at least .008 inch, the base plies of which laminated sheet material comprise at least two sheets which are individually at least .002 inch thick and have a porosity of at least five seconds, and in which the laminant is a thermoplastic adhesive laminant present in an amount of a least about fifty-five pounds of laminant per ream of laminated sheet material, said carton comprising a carton body having a series of carton members, including panels and flaps articulated to said panels along score lines, at least some of said carton members being folded upon each other to provide a plural layered closure in which one carton member lies in juxtaposition to another carton member so as to place a surface of the one carton member in opposed facing relation to the surface of the other carton member and thereby provide an area for a seal between said members, at least one of said carton members being provided, in a ply thereof constituting a surface thereof which is in opposed facing relationship with the surface of the other carton member in the said sealing area, with openings from the surface thereof to the intercalated laminant layer thereof, and bodies of solidified thermoplastic laminant adhesive extending from the intercalated laminant layer of at least the one carton member through the openings provided in the ply of that carton member to at least the surface of the other carton member, effectively sealing said one carton member to said other carton member in the area of their opposed facing relationship.

33. An erected and sealed carton formed of laminated sheet material having an over-all thickness of at least .008 inch, the base plies of which laminated sheet material comprise at least two sheets which are individually at least .002 inch thick and have a porosity of at least five seconds, and in which the laminant is a thermoplastic adhesive laminant present in an amount of at least about fifty-five pounds of laminant per ream of laminated sheet material, including a carton body having a series of closure flaps at an end thereof and articulated with face panels thereof along score lines, said series of flaps including an inner flap, an intermediate flap, and an outer flap, said flaps being folded to provide a plural layered closure in which flaps lie with the surface of one flap upon the surface of another flap, at least one of said intermediate and outer flaps being provided, in a ply thereof constituting a surface thereof which lies in opposed facing relationship therebetween, with openings from the surface thereof to the intercalated laminant layer thereof, and bodies of solidified thermoplastic laminant adhesive extending from the intercalated laminant adhesive layer of at least the one flap through the openings provided in the ply of that flap to at least the surface of the other flap, effectively sealing said outer flap to said intermediate flap in the area of their opposed facing relationship.

34. A sealed carton according to claim 33, wherein openings are present in the inner ply of the outer flap and wherein the outer carton wall is formed of a paperboard sheet coated with a material selected from the group consisting of pigments and clays.

35. An erected and sealed carton formed of laminated sheet material having an overall thickness of at least .008 inch, the base plies of which laminated sheet material comprise at least two sheets which are individually at least .002 inch thick and have a porosity of at least five seconds, and in which the laminant is a thermoplastic adhesive laminant present in an amount of at least about fifty-five pounds of laminant per ream of laminated sheet material, including a carton body having a series of closure flaps at an end thereof and articulated with face panels thereof along score lines, said series of flaps including an end flap, an intermediate flap, and an outer flap, said flaps being folded to provide a plural layered closure in which flaps lie with the surface of one flap upon the surface of another flap, said intermediate flap being recessed along an edge thereof so as to be narrower than said outer flap along at least a portion of an edge thereof and so as to provide an area of overhang of said intermediate flap by said outer flap, said end flap providing a surface for opposed facing relation with said outer flap in said area of overhang, at least one of said intermediate and outer flaps being provided, in a ply thereof constituting a surface thereof which lies in opposed facing relationship therebetween, with openings from the outer surface thereof to the intercalated thermoplastic adhesive laminant layer thereof, bodies of solidified thermoplastic laminant adhesive extending from the intercalated layer of at least the one flap through the openings provided in the ply of that flap to at least the surface of the other flap, thereby providing an effective seal of said outer flap to said intermediate flap in the area of their opposed facing relationship, and a body of solidified thermoplastic adhesive laminant in said area of overhang interfacially bonding said end flap to said outer flap and sealing off the recessed edge of said intermediate flap.

36. A sealed carton according to claim 35, wherein openings are provided in the ply of the outer flap which is inwardly disposed and wherein openings are also provided in the ply of the intermediate flap which is inwardly disposed, and wherein bodies of solidified thermoplastic adhesive laminant extend from the intercalated layer of said outer flap through said ply openings to the outer surface of said intermediate and end flaps and additional bodies of solidified adhesive laminant extend from the intercalcated layer of said intermediate flap through said ply openings to the outer surface of an end flap.

37. An erected and sealed carton formed of laminated sheet material having an over-all thickness of at least .008 inch, the base plies of which laminated sheet material comprise at least two sheets which are individually at least .002 inch thick and have a porosity of at least five seconds, and in which the laminant is a thermoplastic adhesive laminant present in an amount of at least about fifty-five pounds of laminant per ream of laminated sheet material, including a carton body having a series of closure flaps at a end thereof and articulated with face panels thereof along score lines, said series of flaps including an inner flap, an intermediate flap, and an outer flap, said flaps being folded to provide a plural layered closure in which flaps lie with the surface of one flap upon the surface of another flap, said intermediate flap being provided, in both outer plies thereof, with openings from the surfaces of said flap to the intercalated laminant adhesive layer thereof, and a body of solidified laminant adhesive extending from the inner ply of the outer flap through the openings in the plies of the intermediate flap and to the upper surface of said inner flap, thereby providing an effective seal of said outer flap to said inner flap through said intermediate flap and likewise bonding said intermediate flap to said inner and outer flaps.

38. An erected and sealed carton formed of laminated sheet material having an over-all thickness of at least .008 inch, the base plies of which laminated sheet material comprise at least two sheets which are individually at least .002 inch thick and have a porosity of at least five seconds, and in which the laminant is a thermoplastic adhesive laminant present in an amount of at least about fifty-five pounds of laminant per ream of laminated sheet material, said carton having a series of closure flaps at an end thereof and articulated with face panels thereof along score lines, said series of flaps including an inner flap, an intermediate flap, and an outer flap, said flaps being folded to provide a plural layered closure in which flaps lie with the surface of one flap upon the surface of another flap, said intermediate flap being recessed along an edge thereof so as to be narrower than said outer flap along at least a portion of an edge thereof and so as to provide an area of overhang of said intermediate flap by said outer flap, said inner flap providing a surface for opposed facing relation with said outer flap in said area of overhang, said intermediate flap being provided, in both outer plies thereof, with openings from the surfaces thereof to the intercalated laminant adhesive layer thereof, a body of solidified thermoplastic adhesive laminant in said area of overhang interfacially bonding said inner flap to said outer flap and sealing off the recessed edge of said intermediate flap, and solidified thermoplastic laminant adhesive extending from the inner ply of the outer flap through the openings in the plies of the intermediate flap and to the upper surface of said inner flap, thereby providing an effective seal of said outer flap to said inner flap through said intermediate flap and likewise bonding said intermediate flap to said inner and outer flaps.

39. An erected and sealed carton formed of laminated sheet material having an over-all thickness of at least .008 inch, the base plies of which laminated sheet material comprise at least two sheets which are individually at least .002 inch thick and have a porosity of at least five seconds, and in which the laminant is a thermoplastic adhesive laminant, including a carton body having a series of closure flaps at an end thereof articulated with face panels along score lines, said series of flaps including an outer flap and at least one underlying flap, said flaps being folded to provide a plural layered closure in which flaps lie with the surface of one flap upon the surface of another flap, at least one of said outer and underlying flaps being provided, in a ply thereof constituting a surface thereof which lies in opposed facing relationship therebetween, with openings from the surface thereof to the intercalated laminant adhesive layer thereof and bodies of solidified thermoplastic laminant adhesive extending from the intercalated laminant adhesive layer of at least the one flap through the openings provided in the ply of that flap to at least the surface of the other flap, effectively sealing said outer flap to said underlying flap in the area of their opposed facing relationship, the amount of thermoplastic laminant adhesive originally present in said laminated sheet material being sufficient to allow such sealing without delamination of the laminated sheet material of the carton construction.

References Cited by the Examiner

UNITED STATES PATENTS

| | | |
|---|---|---|
| 2,441,477 | 5/48 | Farrell. |
| 2,506,056 | 5/50 | Bergstein _____ 229—48 X |
| 2,550,520 | 4/51 | Bennett _____ 229—48 |
| 2,661,141 | 12/53 | Zinn _____ 229—48 X |
| 3,062,432 | 11/62 | Jacke _____ 229—48 X |

GEORGE O. RALSTON, *Primary Examiner.*

UNITED STATES PATENT OFFICE
CERTIFICATE OF CORRECTION

Patent No. 3,194,474                                July 13, 1965

George G. Rumberger

It is hereby certified that error appears in the above numbered patent requiring correction and that the said Letters Patent should read as corrected below.

Column 2, line 14, for "particularly" read -- particular --; column 9, line 20, for "or" read -- of --; column 11, line 46, for "plane" read -- plan --; line 55, before "in" insert -- shown --; column 12, line 2, for "plie" read -- ply --; column 14, line 49, for "longitudinal edge of flap 131." read -- tapered effect to the flap 132. --; column 33, line 20, for "black" read -- blank --; column 35, line 71, for "of a" read -- of at --.

Signed and sealed this 12th day of April 1966.

(SEAL)
Attest:

ERNEST W. SWIDER                                              EDWARD J. BRENNER
Attesting Officer                                                       Commissioner of Patents